US011212570B2

(12) United States Patent
Moroney et al.

(10) Patent No.: US 11,212,570 B2
(45) Date of Patent: Dec. 28, 2021

(54) VIEWING DATA

(71) Applicant: TVA Group LTD, Poole (GB)

(72) Inventors: Kevin Moroney, Dorest (GB); Daniel Cherowbrier, Dorest (GB); Jonathan Marshall, Dorest (GB); Andrew Wilson, Dorest (GB)

(73) Assignee: TVA Group Ltd, Poole (GB)

( * ) Notice: Subject to any disclaimer, the term of this patent is extended or adjusted under 35 U.S.C. 154(b) by 0 days.

(21) Appl. No.: 16/647,227

(22) PCT Filed: Sep. 14, 2018

(86) PCT No.: PCT/GB2018/052624
§ 371 (c)(1),
(2) Date: Mar. 13, 2020

(87) PCT Pub. No.: WO2019/053450
PCT Pub. Date: Mar. 21, 2019

(65) Prior Publication Data
US 2020/0275146 A1 Aug. 27, 2020

(30) Foreign Application Priority Data
Sep. 15, 2017 (GB) ..................................... 1714911

(51) Int. Cl.
*H04N 21/258* (2011.01)
*H04N 21/24* (2011.01)
(Continued)

(52) U.S. Cl.
CPC ... *H04N 21/25841* (2013.01); *H04N 21/2407* (2013.01); *H04N 21/6112* (2013.01); *H04N 21/6437* (2013.01); *H04N 21/64322* (2013.01)

(58) Field of Classification Search
CPC ......... H04N 21/25841; H04N 21/2407; H04N 21/6112; H04N 21/64322; H04N 21/6437;
(Continued)

(56) References Cited

U.S. PATENT DOCUMENTS

| 10,123,063 | B1* | 11/2018 | Brown | H04N 21/42684 |
| 2005/0198667 | A1* | 9/2005 | Lee | H04N 21/4104 |
| | | | | 725/47 |

(Continued)

FOREIGN PATENT DOCUMENTS

| EP | 0977389 | 2/2000 |
| EP | 2767084 | 4/2015 |

(Continued)

OTHER PUBLICATIONS

Venkata N Padamanabban et al: Determining the geographic location of Internet hosts. Measurement and Modeling of Computer Systems, ACM, 2 Penn Plaza. Suite 701NewYorkNY10121-0701USA. Jun. 1, 2001 (Jun. 1, 2001). pp. 324-325. XP058374605. DOI: 10.1145/378420.378814 ISBN: 978-1-58113-334-9; Paragraph 2.3: "GeoCluster".

*Primary Examiner* — Fernando Alcon
(74) *Attorney, Agent, or Firm* — Renner Kenner Greive Bobak Taylor & Weber

(57) ABSTRACT

A method of automatically logging and collating geographic viewing data for broadcast television comprises providing a media device with a reporting means arranged to generate viewing data detailing a channel being watched automatically once received by the media device, and to transmit that
(Continued)

viewing data to a server using a transport protocol, so forming transmitted viewing data comprising the generated viewing data and one or more headers associated with the transport protocol; processing the transmitted viewing data to identify information comprising at least one of: transmission metadata from a transmitter which transmitted the channel to the media device; and an external IP address of the media device; matching at least one of the viewing-data, the transmission metadata, and the external IP address to external data; and determining the geographical location from which the viewing-data originated using at least one of the identified information and the matched external data.

19 Claims, 11 Drawing Sheets

(51) Int. Cl.
  *H04N 21/61* (2011.01)
  *H04N 21/643* (2011.01)
  *H04N 21/6437* (2011.01)
(58) Field of Classification Search
  CPC .. H04N 21/44204; H04H 60/51; H04H 50/31; H04H 20/38; H04H 60/13; H04H 60/33; H04H 60/46; H04H 60/59; H04H 60/61; H04H 60/70; H04H 60/73; H04H 2201/16; H04H 2201/37; H04H 60/31
  See application file for complete search history.

(56) References Cited

U.S. PATENT DOCUMENTS

| | | | |
|---|---|---|---|
| 2009/0276821 A1* | 11/2009 | Amento | H04N 21/2407 725/116 |
| 2011/0082861 A1 | 4/2011 | Gibson et al. | |
| 2013/0036434 A1* | 2/2013 | Shkedi | H04N 21/64322 725/14 |
| 2013/0208591 A1* | 8/2013 | Larsen | H04W 12/10 370/230 |
| 2014/0006951 A1* | 1/2014 | Hunter | H04N 21/431 715/719 |
| 2014/0026158 A1 | 1/2014 | Rowe et al. | |
| 2014/0049693 A1* | 2/2014 | Selim | H04N 21/414 348/570 |
| 2016/0037201 A1* | 2/2016 | Kitts | H04N 21/44222 725/35 |
| 2016/0037231 A1* | 2/2016 | MacKenzie | H04N 21/6175 725/123 |
| 2017/0169384 A9 | 6/2017 | Orlowski | |
| 2017/0236182 A1* | 8/2017 | Ignatyev | G06Q 30/0631 705/26.7 |
| 2021/0021887 A1* | 1/2021 | Splaine | H04N 21/25883 |

FOREIGN PATENT DOCUMENTS

EP 2936710 11/2015
WO 2017/144126 8/2017

* cited by examiner

VIEWING DATA

The invention relates to a method of automatically logging and collating viewing data for free-to-air television broadcasts, including digital satellite (D-SAT), digital cable (D-CABLE), and digital terrestrial television (DTT) including Advanced Television Systems Committee (ATSC) and digital video broadcasting (DVB) broadcasts. In particular, the viewing data may be collected with no user input, and may be used to provide figures for live and historic viewership for television broadcasting assets.

Live measurements may be displayed on smart phones and computers; and a report, which may be generated automatically (e.g. overnight), and which may be emailed, optionally automatically, to specified users on a daily basis. The system may include other features and benefits including analytics per programme and advert break. This level of analysis is facilitated by the system being highly automated, and optionally also by avoidance of data processing by third parties.

In the prior art, television audience measurement technologies use a combination of viewer diaries, proprietary set top boxes (which are only available as part of a selected measurement group of participants who sign up for one), and opt-in monitoring (via satellite distributed television systems). This is relatively expensive to operate and such systems cannot provide live viewer figures, and in addition may predict inaccurate viewer figures for some channels.

In prior art systems, the viewer logs—either on paper or via a remote control and set top box—the times that they joined a programme and how many others were in the room. For current television (TV) statistics in the UK, generated by the Broadcasters' Audience Research Board (BARB®), a demographic selection of 5,100 households, which is derived from a wider sample group of 50,000 households, is selected and self-monitored to estimate a demographically representative audience for the population. This relatively small sample can introduce errors and may not be 'relevant' statistically speaking. The costs involved in acquiring such a sample may make the introduction of such a method for particular channel(s) unviable, or may prevent the use of larger sample sizes.

This sample audience data is used to calculate the extrapolated viewing trends across the UK population.

The TV industry has changed dramatically since the 1980s, and viewers now have access to hundreds of TV channels. Some of the TV channels have large viewing figures but others are small, for example aiming at specialist markets. The introduction of satellite and cable TV happened in the UK during the 1980s and 90s, with digital broadcasting being introduced from the 1990s onwards. Video on Demand (VoD) and Internet Protocol TV (IPTV) are also significant developments which are changing the way people consume content.

With the increasing number of channels, although the amount of TV viewing hours per week has increased, these hours are now spread amongst many more sources. People view content via 'linear' TV where the content is scheduled and broadcast at specific times but also increasingly via 'non-linear TV' where content is consumed when the viewer chooses. TV peak viewing is different and fewer programmes attract large audiences.

During this same period, the internet has become established and TV has shifted from being the dominant and premium advertising medium, with radio and print secondary, to one which has to share advertising revenue with the internet—Google®, You-Tube® and others.

In summary, the TV industry has seen dramatic changes with:

Introduction of more ways to watch TV with satellite, cable, and internet provision and the introduction of watching video on demand via You Tube®, iPlayer® etc.;

Viewing habits changing with video on demand increasing and 'linear TV' declining (albeit from a high base);

Fragmented viewing across channels and platforms (internet, satellite, cable);

Increased competition for advertising across platforms including the internet;

Larger number of channels with relatively smaller viewing figures; and

Capturing content becoming cheaper because of technology changes.

The changes described above have created a demand for cost effective, accurate and 'live' viewer statistics for an increased number of channels for which access to viewing figures is wanted. BARB® does not serve these clients well or, in many cases, at all. BARB® is expensive and, because of the way their data collection is done, often underestimates viewing for smaller channels. BARB® uses respondents at circa 5100 households across the UK, and then uses this information to provide an estimated representation of the 65 million people in the UK. The relatively small viewing figures for some channels makes BARB® figures statistically un-reliable, particularly for regional broadcasting.

In addition, commercial operators embed tracking systems within their proprietary TV receivers to allow the delivery of viewer information to the broadcast system operator. This is based on a named sample market, who have self-selected to become measured households (for example by signing up as a customer of Sky® or another such provider). Members of the sample market provide their personal information to the commercial operator and this is linked to their TV receiver by a user ID.

These measurement systems are based upon identifying individuals and tracking their behaviour to understand consumption, viewing patterns and socio-demographic status, but do not work for digital terrestrial television, for which there is no subscriber list.

In the following, the invention is described in respect of digital terrestrial television (DTT). However, the skilled person will appreciate that the invention may be equally applicable to any free-to-air platform, including digital satellite (D-SAT), digital cable (D-CABLE), and digital terrestrial television (DTT) including Advanced Television Systems Committee (ATSC) and digital video broadcasting (DVB) standard broadcasts.

According to a first aspect of the invention, there is provided a method of automatically logging and collating geographic viewing data for broadcasts, such as free-to-air broadcast television, watched on a media device.

The skilled person will appreciate that automatic logging may increase sample size and accuracy as compared to (non-automatic) prior art techniques because:

(i) no user input is required at the start of a session (as for BARB® and the likes) so the risk of a user forgetting to activate the monitoring is avoided as no activation is required;

(ii) no user sign-up is required, so unlike for Sky® and the likes, no user account is required and the viewers do not need to be customers of any particular company—any media device displaying broadcast television channels can be monitored in this way;

(iii) in various embodiments, no user opt-out may be available and users may therefore be unaware of any monitoring taking place. The skilled person will appreciate that, in such embodiments, the data collected must be compliant with the General Data Protection Regulation (GDPR)—if in the EU, and with any equivalent legislation if elsewhere. Viewing data may therefore need to be statistically reconstructed using minimal data as no identification of the user or media device may be transmitted in some such embodiments; and (iv) human error in data entry and/or collection is avoided, so improving accuracy.

The automated approach disclosed herein may therefore provide one or more of the following benefits:

(a) live viewer figures, whereas other systems including BARB® cannot provide live data;

(b) a significant cost advantage over the BARB® system and other similar systems;

(c) a larger sample size which gives better results—BARB® cannot increase its sample size to anywhere near the same extent because it would be cost prohibitive to do so (data can be collected from millions of devices using embodiments described herein);

(d) greater accuracy through a much larger sample size and also by eliminating the human error inherent in BARB® and similar systems.

No user/viewer input or intervention may therefore be requested or required in some embodiments. In alternative embodiments, user consent may be requested for the sake of targeted advertising and the likes, and more in-depth data may be collected in such embodiments.

The skilled person will appreciate that, without such automation, it may not be viable to increase the sample size. Furthermore it might not be viable to provide 'live' or 'real-time' viewer statistics. The automation of the system may provide various benefits—namely more accurate forecasts as the sample size is larger and the sample does not rely upon user input of data (which will always be subject to human error either deliberately or erroneously), a significant cost advantage, and live viewer figures.

The method may comprise one or more of the following:

(a) providing the media device with a reporting means. The reporting means may be arranged to generate viewing data detailing a channel being watched on the media device. The reporting means may be arranged to generate the viewing data automatically following its provision to the media device and/or following selection of a relevant channel—no activation or other user input may be required. Further the reporting means may be arranged to transmit that viewing data to a remote server using a transport protocol. The generation and transmission may comprise the reporting means prompting the media device to transmit data to a data collector. The transmission may form transmitted viewing data—i.e. the generated viewing data combined with any one or more headers, and optionally additional metadata, generated as a part of the transmission process. Some embodiments may use the DTT metadata to identify the transmitter ID and/or transport stream metadata. Further, sonic embodiments may utilise the transport stream metadata to identify the relevant geographic region eg Birmingham, London, New York, Washington, Sydney, etc. and/or the television regions (eg Grampian, Meridian, etc.)

(b) Further, the method may process the viewing-data and/or one or more headers associated with the transport protocol (i.e. any part(s) of the transmitted viewing data) to identify information comprising at least one of:

(i) transmission metadata from a transmitter which transmitted the channel being watched to the media device; and (ii) an external IP address of the media device.

(c) The method may comprise matching information from at least one of the viewing-data, and/or the one or more headers associated with the transport protocol to external data. For example, the method may comprise matching the external IP address and/or the transmission metadata to the external data. In some instances, the viewing data itself may be used for matching, alone or in conjunction with other information—for example, the viewing data may indicate that a particular channel and/or programme was being viewed which is only available within a specific geographic area; e.g. local news bulletins.

(d) The method may subsequently determine the geographical location from which the viewing-data originated using at least one of the identified information and the matched external data.

The broadcast television may be free-to-air broadcast television, and optionally the free-to-air broadcast television is digital terrestrial television (DTT), including the various standards such as ATSC and DVB, and the transmitter is a DTT transmitter.

The method may further comprise utilising an application installed on the media device as the reporting means. The skilled person will appreciate that embodiments may therefore not require any additional hardware (e.g. a separate set-top box or the likes), instead being implemented by an application operating on the standard hardware.

The viewing data generated by the reporting means may comprise at least one of time and channel information.

The processing may comprise extracting the external IP address from a header of the one or more headers.

The one or more headers may be the only source of information used to determine the geographical location from which the viewing-data originated.

The method may further comprise the reporting means generating a device ID or application instance ID and sending the device ID or application instance ID with the viewing data. The skilled person will appreciate that the ID generated for a given device may be different for each viewing session in some embodiments, so serving as an identifier of the session rather than the device—the skilled person will appreciate that such an approach may be particularly beneficial for GDPR compliance or the likes, for which assigning an ID to a particular device may be unwanted. The ID may therefore be referred to as a session ID or application instance ID. In other embodiments (e.g. when consent to monitoring has been given) a device ID which remains the same for a given media device over different sessions may be assigned and used.

The geographical location may be determined using transmission metadata including Transmitter ID and channel type.

The reporting means may send no personal information of a viewer to the remote server.

The remote server may poll the reporting means at intervals to request the viewing data. Alternatively or additionally, the remote server may tell the reporting means how frequently to poll and the reporting means may provide the viewing data accordingly.

The external data may comprise demographic data.

The transmitting the viewing data to the remote server may be performed using an internet connection of the media device.

The reporting means may be software arranged to run on the media device, and the method may include transmitting the reporting means to the media device as part of the broadcast.

The reporting means may be transmitted to the media device using its addressable network connection eg the internet or other network, which may be a wide area network and/or a private network, etc. Conveniently, the addressable network connection may provide what can be thought of as an Interaction Channel.

According to a second aspect of the invention, there is provided a system for automatically logging and collating geographic viewing data for broadcasts, such as free-to-air broadcast television, watched on a media device. The system may comprise:

a reporting means provided at the media device. The reporting means may be arranged to automatically generate viewing data detailing a channel being watched on the media device. Further, the viewing means may be arranged to transmit that viewing-data to a remote server using a transport protocol (so generating transmitted viewing data);

the remote server may be arranged to receive and process the viewing data, wherein the processing may include:

processing the viewing data and/or one or more headers associated with the transport protocol (i.e. processing the transmitted viewing data) to identify information comprising at least one of:

(i) transmission metadata from a transmitter which transmitted the channel being watched to the media device; and (ii) an external IP address of the media device.

The server may be arranged to match the viewing-data and/or the one or more headers associated with the transport protocol to external data. For example, the system may comprise matching the external IP address and/or the transmission metadata to the external data. In some instances, the viewing data itself may be used for matching, alone or in conjunction with other information.

The server may be arranged to determine the geographical location from which the viewing-data originated based on at least one of the identified information and the matched external data.

The broadcast television may be free-to-air broadcast television, and optionally the broadcast television may be digital terrestrial television (DTT), including the various standards such as ATSC and DVB, and the transmitter may be a DTT transmitter.

The reporting means may comprise an application installed on the media device.

The system may comprise one or more geographic and/or demographic data sources arranged to provide the external data to the remote server.

The remote server may be arranged to extract the external IP address from a header of the one or more headers.

The reporting means may be arranged to transmit the viewing data to the remote server using an internet connection.

The reporting means may be software arranged to run on the media device, and the reporting means may be transmitted to the media device as part of the broadcast. The reporting means may also be transmitted to the media device using its addressable network connection eg the internet or other network, which may be a wide area network and/or a private network, etc.

According to a third aspect of the invention, there is provided a method of automatically logging and collating geographic viewing data for broadcast television watched on a media device. The method may comprise one or more of the following steps:

i) broadcasting a transmission comprising at least one of a signal containing instructions, which when downloaded, define a reporting means and channel content, wherein the reporting means comprises a software application;

ii) receiving the transmission at the media device;

iii) running the reporting means on the media device so as to generate viewing data detailing a channel being watched on the media device; and iv) transmitting the viewing data to a remote server over a network connection.

The broadcast television may be free-to-air broadcast television, and optionally the broadcast television may be digital terrestrial television (DTT), including the various standards such as ATSC and DVB, and the transmitter may be a DTT transmitter.

The reporting means may be software arranged to run on the media device, and the reporting means may be transmitted to the media device as part of the broadcast. The reporting means may also be transmitted to the media device using its addressable network connection eg the internet or other network, which may be a wide area network and/or a private network, etc.

According to a fourth aspect of the invention, there is provided system for automatically logging and collating geographic viewing data for broadcast television watched on a media device. The system may comprise any of the following:

i) a transmitter arranged to broadcast a transmission. The transmission may comprise at least one of, instructions defining a reporting means and channel content, wherein the reporting means comprises software;

ii) a media device arranged to receive the transmission and to run the software so as to generate and transmit viewing data detailing a channel being watched on the media device; and iii) a remote server arranged to receive the transmitted viewing data from the media device over a network connection.

The broadcast television may be free-to-air broadcast television, and optionally the broadcast television may be digital terrestrial television (DTT), including the various standards such as ATSC and DVB, and the transmitter may be a DTT transmitter.

The reporting means may be software arranged to run on the media device, and the reporting means may be transmitted to the media device as part of the broadcast. The reporting means may also be transmitted to the media device using its addressable network connection eg the internet or other network, which may be a wide area network and/or a private network, etc.

The invention may provide a more accurate, when compared to existing systems, live and historic system for the measurement of television audiences from traditional broadcast platforms, using geographic location identifiers. The system may capture, calculate and segment audience data, allowing a resulting set of audience calculations to be determined. Conveniently, these may be presented in a graphical user interface, and/or to output results in another form of user interface.

In some embodiments, the user interface comprises a map arranged to show numbers of viewers by geography.

The skilled person will appreciate that aspects of the invention may provide an effective system and method for capturing free-to-air broadcast data without the need for complex applications or form filling to understand the location of the viewer. Further, human error and omissions may be eliminated, or at least reduced.

By combining different location tools, some embodiments may be able to provide a location which may then be used in conjunction with other datasets for the generation of mass reporting on audience and channel figures. In various embodiments, the location tools include transmission metadata (comprising the transmitter ID and transport stream data) and IP metadata (including, but not limited to, network (such as broadband, fibre, satellite, or the like) provider, connection speed, type of connection and other metadata)—which is combined with other data sources so as to identify the location more accurately than could generally be done with DTT (or other broadcast) transmission metadata and/or IP metadata alone.

The media device and/or the reporting means may generate an identifier, which may be referred to as a BoxID. Preferably, the identifier is unique, but it may not be.

Various embodiments may allow for identification of viewer sessions, durations within a programme or piece of content, and programme loyalty. Such embodiments may use the unique identifier. Conveniently, the method is arranged to poll the media device at set and/or dynamic intervals. As used herein, "poll" is taken to refer to the transmission of data samples, whether this is one-way communication from the reporting means to a back-end (for example a remote server), or two-way communication of the back-end requesting data and the reporting means transmitting data in response to each request.

Conveniently, the media device may initiate the polling, via the reporting means. The initiation may comprise a message sent from the media device, via the reporting means, to notify the back-end of the reporting means' presence. The back-end may poll the media device at intervals to request data, and the media device may be arranged to respond accordingly. Alternatively, the back-end may tell the reporting means how frequently to provide viewing data (and may change this frequency as the session continues). Advantageously, the reporting means may then continue to poll without requiring feedback from the back-end, so avoiding a need for more two-way communications.

However, embodiments may also be arranged such that the reporting means transmits data at set intervals or dynamic intervals. Polling is thought to be advantageous, since it allows a dynamic interval to be created centrally where the period may be influenced by the data being collected.

The combination of location, additional datasets, and a dynamic "big data" database in various embodiments may enable levels of data never seen before in this field, with a resolution higher than current products.

The skilled person will appreciate that, as compared to the approach taken by BARB®, the present invention approaches the challenge of providing accurate viewing data differently. Advantageously, the approach disclosed herein may also serve smaller channels, i.e. those with a low number of viewers, in a cost-effective manner.

The approach disclosed herein involves the collection of anonymous viewing data from TVs, set-top boxes, or other similar devices. Embodiments allow viewing data to be collected from a large number of devices—potentially measured in millions.

However, the viewing data gathered from the media devices is generally insufficient to provide accurate location information. The DTT metadata provides transmitter ID and transport stream metadata which can identify the relevant geographic region eg Birmingham, London, New York, Washington, Sydney, etc. and the television region—e.g. Grampian, Meridian etc. However, these are generally large geographic areas. The metadata can be used to identify the correct regional version of programme channel numbers (known as Central System Information)—this can be used to provide the programme guide. The system disclosed herein uses this metadata and links it to other data sources, including databases which allow a location or region to be identified from IP addresses, to identify the location more precisely.

BARB® gathers all of the data it needs from one source—the respondent/viewer when surveyed—but this survey information is only available for a limited number of viewers. The approach disclosed herein uses other data sources and algorithms to provide predictions for total viewing hours and also demographic of viewer households. The structure of the database and the algorithms used allow more accurate and real-time viewing data to be provided.

The skilled person would understand that features described with respect to one aspect and/or embodiment of the invention may be applied, mutatis mutandis, to any other aspect and/or embodiment of the invention.

According to a further aspect of the invention there is provided a reporting means arranged to be transmitted in a broadcast signal and received on a media device.

According to yet further aspects of the invention there are provided machine readable data carriers including instructions which when loaded onto a computer cause that computer to function as the system of any of the above aspects of the invention or to provide the method of any of the above methods.

The machine readable media referred to herein may be any of the following, non-exhaustive list, of media: a CD (ROM/RAM +RW/+R −R/−RW); a DVD, a BluRay®; a hard-drive (with platters or a solid state device); a memory (whether volatile, or non-volatile, such as an SD Card, a Flash drive, a memory stick, an XD card, or the like), a transmitted signal, an Internet download (including FTP or the like), a wire.

There now follows by way of example only a detailed description of embodiments of the present invention with reference to the accompanying drawings in which.

Figure 10:
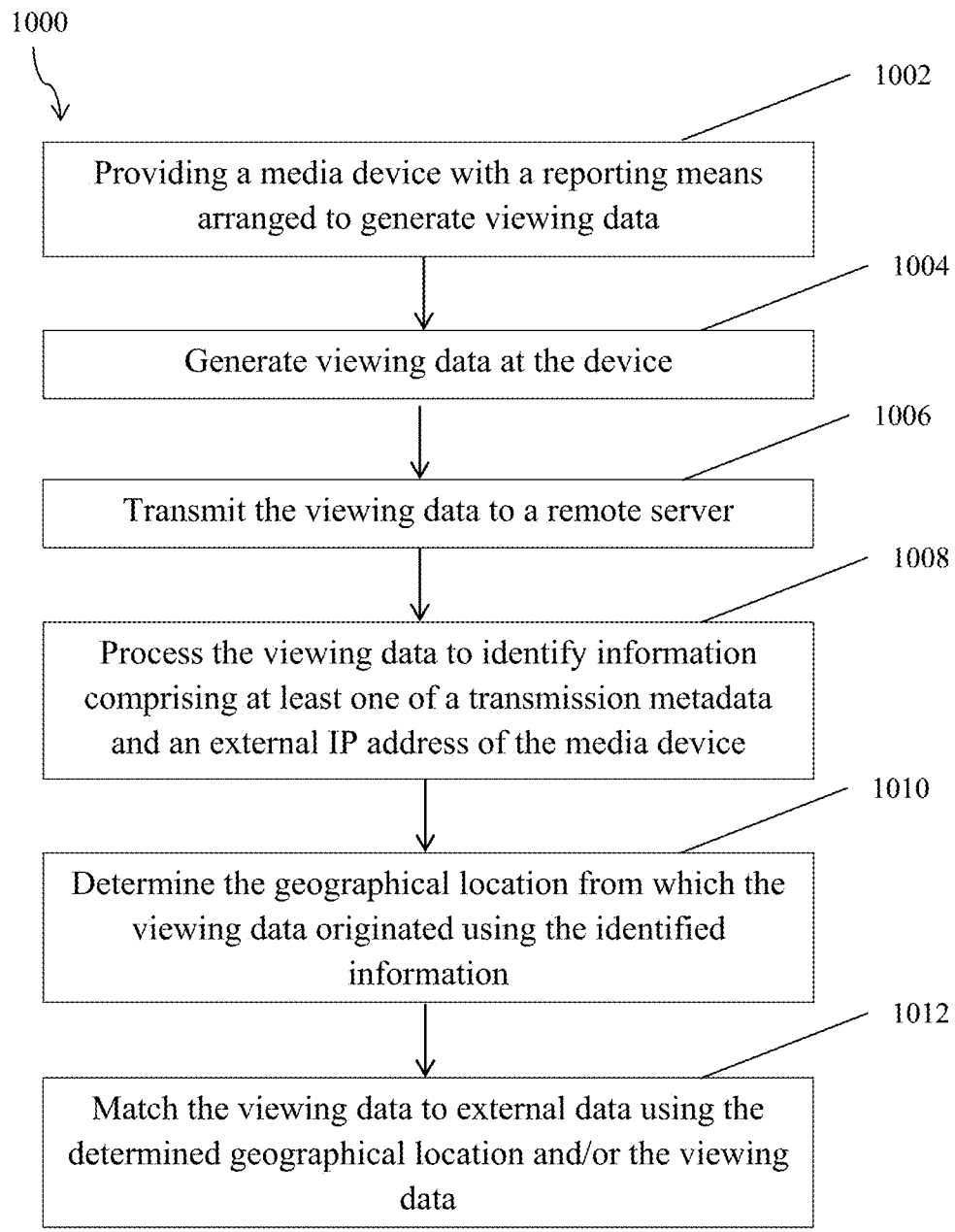
Figure 11:
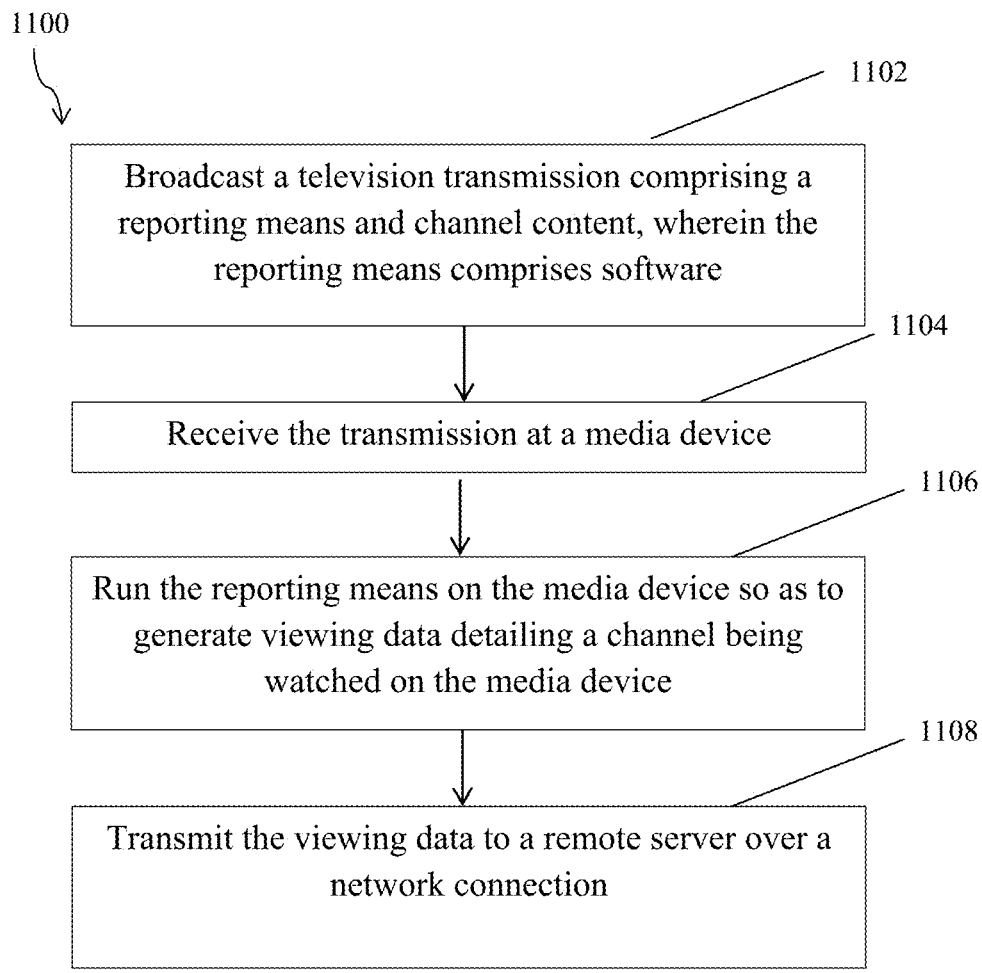

FIG. 10 provides an overview of a method of an embodiment;

FIG. 11 provides an overview of a method of an embodiment; and

Figure 12:
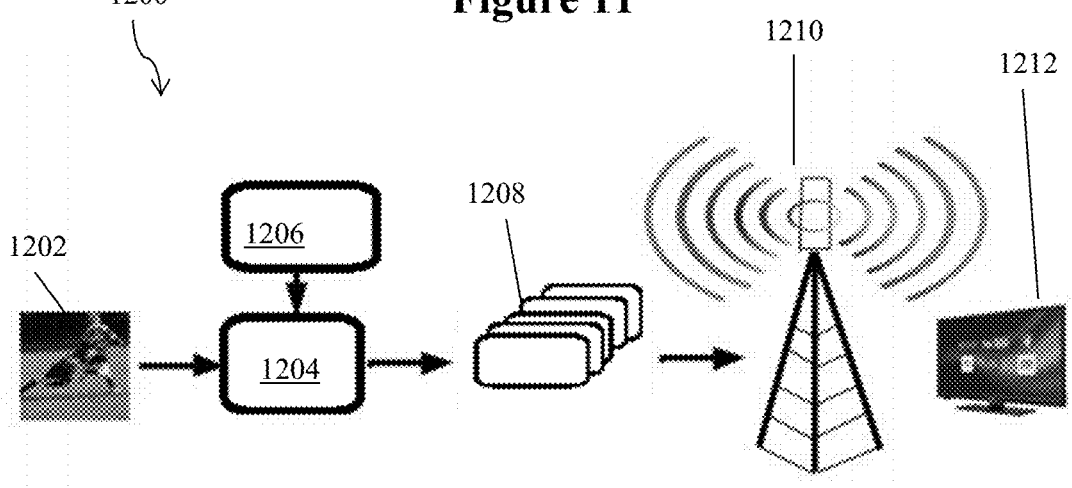

FIG. 12 provides an overview of a system of an embodiment.

Figure 1:
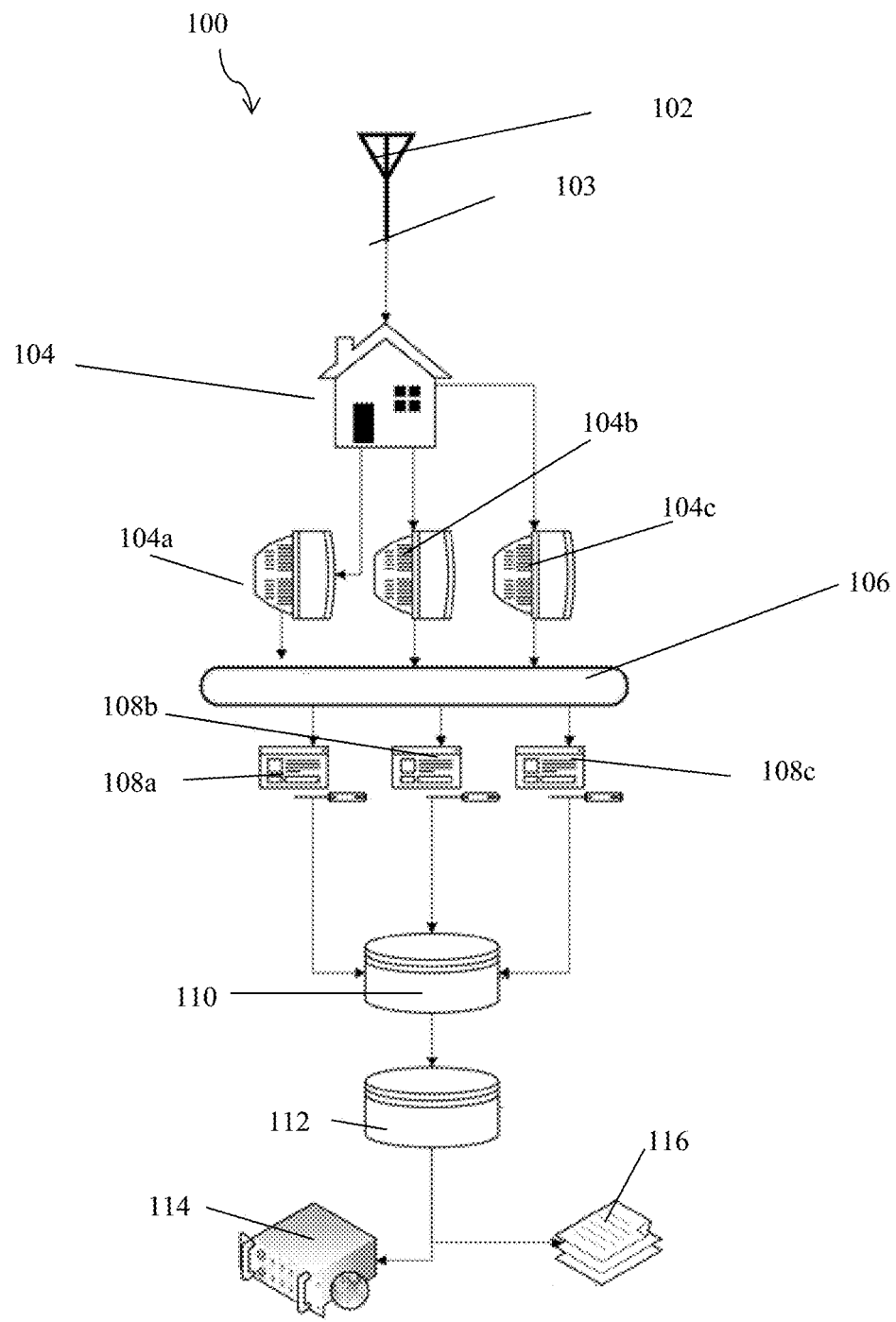
FIG. 1 shows a schematic system diagram according to an embodiment.

FIG. 1 shows a system 100 of an embodiment of the invention.

A television transmitter 102 transmits a digital terrestrial television (broadcast.

In other embodiments, any other type of broadcast could take the place of the DTT broadcast, for example D-SAT or D-CABLE. Outside of the UK, other broadcast types and standards such as DVB or ATSC (US) may be used, and the skilled person will appreciate that the invention may also be applied to such broadcasts. The broadcast type described herein for ease of reference is therefore not intended to be limiting. The skilled person will appreciate that the invention is likely to be most useful for free-to-air broadcasts, for which no subscription is required and hence no subscriber information available.

Any suitable media device 104a-c may pick up the broadcast signal 103, for example televisions 104a-c, which may be in a viewer's home 104 (in-home viewing 104). Media devices 104a-c may also include other devices such as computers, set-top boxes, and the like. Any device capable of receiving and presenting a broadcast television signal may be a media device 104a-c. There may be multiple media devices 104a-c per household 104.

There is no need for a viewer to register, or for a media device 104a-c to be registered, to receive the broadcast, in this case a DTT broadcast. Embodiments are typically arranged to comply with data-privacy laws such that they can run, transparently and collect data anonymously, without a viewer being aware that the viewing data is being collected.

It will be appreciated that in a DTT system, and in other free to air television broadcast systems, the transmitter 102 cannot sense whether, or by how many viewers/devices 104a-c, the broadcast signal has been viewed, and there is currently no automated method of gathering viewing data. Viewers do not need to register for the transmissions.

In the embodiment being described, each media device 104a-c has a reporting means 108a-c associated therewith. In the embodiment being described, the reporting means is an application ("app") 108a-c installed on the media device 104a-c. Thus, the reporting means may be thought of as a viewing-data generator, in that it generates viewing data ready for transmission.

The application 108a-c logs when the television broadcast is received by a receiver of the media device 104a-c for presentation, generating viewing data; i.e. the log constitutes viewing data. Application logging and reporting may therefore be performed by the TV receiver 108.

The application 108a-c is arranged to report viewing data to a remote server 110, 112 via a network. As such, data are generally packetised for transmission according to a transport protocol, which generally results in IP metadata being associated with the viewing data—this association of metadata with the viewing data for or during transmission may be thought of as the generation of transmitted viewing data.

The geolocation processor 106 is a part of the application 108a-c. In the embodiment being described, the IP metadata is processed by the geolocation processor 106 to identify a location (if possible from the metadata available). Part or all of the IP metadata may then be removed to improve or ensure anonymity, before the viewing data is sent out or further processed. The identified location is added to the data to be sent, either as an element of the viewing data or within associated metadata. In alternative embodiments. IP metadata may not be used.

In alternative embodiments, for example embodiments in which a privacy risk is not an issue, all metadata may be passed on for processing instead of performing any location processing at the media device 104a-c.

The application 108a-c reports the viewing data to a remote server 110, 112.

In the embodiment being described, the viewing data comprises a channel ID which identifies which broadcast stream is being presented to one or more viewers of the media device 104a-c.

In the embodiment being described, the viewing data comprises time information, in this case a time stamp for a time at which the channel ID was sampled. In additional or alternative embodiments, the time information may include an initiation time and a current time, or disconnection time (e.g. "watched from 15:00 to 15:27"), or may include a time period (e.g. initiation: "15:00" duration: "27 minutes") to indicate a period of time for which a media stream corresponding to the channel ID has been presented.

In alternative or additional embodiments, the viewing data may not comprise time information, and may instead be time-stamped on arrival at the remote server 110, 112.

In the embodiment being described, the application 108a-c has access to data concerning the media device 104a-c, for example device type, screen size, and the likes. In the embodiment being described, the application 108a-c transmits selected data about the media device 104a-c to the remote server 110, 112 with the viewing data, or separately.

In the embodiment being described, the application 108a-c does not store any viewing data and simply transmits data when polled. In the embodiment being described, the polling is initiated by the application 108a-c which tells the media device 104a-c to send viewing data, and where to send it (e.g. the IP address of the remote server). In this embodiment, the remote server 110, 112 tells the application 108a-c how often viewing data should be provided, and the application 108a-c causes the media device 104a-c to send data accordingly. Viewing data are deleted from the local memory once reported so as to conserve local memory. In alternative or additional embodiments, the application 108a-c may store more data, for example including historic viewing data. In the embodiment being described, BoxID (discussed below), and optionally a polling frequency/interval, is the only data stored on the device 104a-c by the application 108a-c.

In the embodiment being described, the remote server 110, 112 comprises a data collector 110 arranged to receive and store data from the applications 108a-c and to perform a first level of sorting and processing and a data manager 112 arranged to further process and collate the data. In alternative or additional embodiments, the data collector 110 and the data manager 112 may be combined into a single entity, or the remote server 110, 112 may be divided into more than two, and/or different, entities. Here it will be appreciated by the skilled person that a collection of physical and/or virtual devices may be made to work together in order to increase the available data bandwidth.

Television transmitters 102 carry identifiers which denote their location and the region that they service. This transmitter identification ("transmitter ID") can be used to provide a geographic reference of the location of the viewer.

The transmitter ID is transmitted with the television broadcast 103 and received by the media devices 104a-c.

In the embodiments being described, the applications 108a-c are arranged to pass on the transmitter metadata to the remote server 110, 112. The transmitter metadata is then used by the data manager 112 to provide an estimate of the location of the media device 104a-c, and hence of the viewer, as discussed above. This estimate is then refined by matching to other data. The metadata comprises transmitter ID in the embodiment being described.

The skilled person will appreciate that when data is sent over a network, the data is packetised and that various headers are added to data packets. The packetised data with the one or more headers may be referred to as transmitted viewing data—it comprises the generated viewing data and metadata associated with the transmission of the generated viewing data (and optionally further metadata). At least some of the headers include metadata relating to the data transfer; at least some of the headers include an IP address of the entity sending data to a third party. In the embodiment being described, it is the external IP address being used by the media device 104a-c that is likely to be of interest in determining the location.

In various embodiments being described, the remote server 110, 112 is arranged to extract the external IP address of the media device 104a-c from headers associated with the sent viewing data. The extracted external IP address is then used to provide an estimate of the location of the media device 104a-c, and hence of the viewer. In other embodiments, IP address may not be used.

In the embodiment being described, the IP metadata (where available) is mapped to an IP database to try to identify a more precise location (if this has not already been done by the geolocation processor 106).

The transmitter metadata (in general including transmitter ID and the transport streams) are processed to identify the transmitter by name, its location and the geographic area of coverage for that transmitter and its service. There are often multiple services or multiplexes broadcast from a single transmitter and each service will have a slightly varying coverage map. The stream identification can therefore be used to narrow down location to a portion of a transmitter's coverage area in some cases.

In embodiments in which both transmitter ID and external IP address are available, the remote server 110, 112 may be arranged to cross-check the two location estimates and refine the estimate based on the overlap where possible. In some instances, IP address may not help to narrow the location estimate—for example, an IP address may simply indicate the country of the media device 104a-c rather than anything more specific, although in other cases IP address alone may provide a sufficiently precise location. Similarly, the DTT metadata on its own generally provides only a wide geographic coverage area—for example, the Crystal Palace transmitter covers most of London. In more rural areas, with flat topology, the area can be much larger still. Embodiments of the invention identify a tighter geographic location. A combination of enquiries and cross-matching, including using external data, is therefore performed to provide a more refined location estimate.

In the embodiment being described, the remote server 110, 112 receives further data, which may be thought of as external data in that it is not provided via the application 104a-c, from another source (i.e. not from the media device). The external data may include one or more of demographic information, IP address/location look-up data sources, transmitter ID/covered area look-up data sources, census data or the likes. Census data or the likes may be used to estimate the number of viewers per media device 104 based on the estimated geographical location and/or other information.

The demographic information for a geographical area may be used to identify likely demographics of viewers.

Various embodiments predict location and demographic using a number of data sources as 'clues' which are linked together with algorithms. Number of viewing hours may be estimated from demographic indications of the number of people in a household 104 and the time for which a media device 104a-c in that household 104 was receiving broadcast content. Various data points e.g. the external IP address, the Digital Terrestrial Transmitter ID and transport stream ID, the viewer device ID, type (including screen size), model and manufacturer, census data, IP data and the likes, and combinations thereof are used in various embodiments.

In the embodiment being described, the remote server 110, 112 matches viewing data to estimated geographic location and predicted demographics.

In the embodiment being described, the data manager 112 provides audience reporting data 116. The audience reporting data 116 comprises some or all of the viewing data gathered by the reporting means, combined with external data and/or otherwise processed to make the data more useful for an end customer, which may be a broadcaster or advertiser.

In the embodiment being described, the data manager 112 provides live and on-demand business information 114.

Broadcasters and/or advertisers may use this information to guide investment and decisions.

Figure 2:
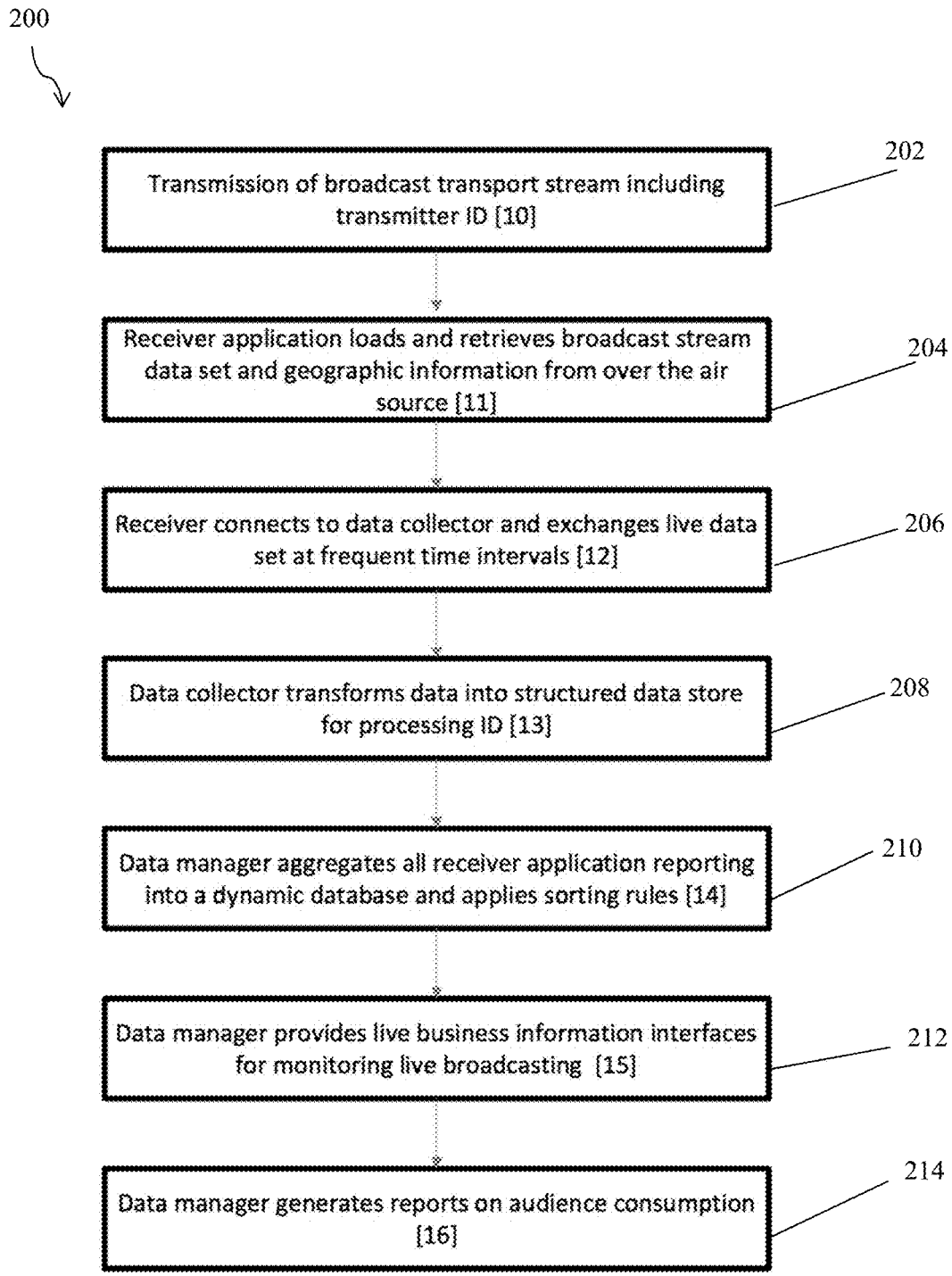
FIG. 2 shows a flow-chart of a method of an embodiment.

The method 200 implemented by the system 100 of the embodiment being described is illustrated by FIG. 2.

At step 202, a broadcast transport stream is transmitted from a transmitter 102. The broadcast transport stream includes media content (e.g. television programmes, advertising, etc.) and the transmitter ID.

At step 204, a receiver (not shown) associated with a media device 104a-c receives and loads the broadcast stream over the air. The broadcast stream includes metadata in addition to the channel content (e.g. television programme)—the metadata includes data from which geographic information can be obtained, including transmitter ID and transport stream data.

The receiver is then connected to a data collector 110 of the remote server 110, 112 (in the embodiment being described, via the application 108a-c). Data, in this case live viewing data, is sent to the remote server 110, 112 at intervals.

In the embodiment being described, the remote server 110, 112 asks the application 108a-c to send the viewing data at specified intervals/times, and the application 108a-c does so. In alternative or additional embodiments, the application 108a-c may send the viewing data on detecting a change (e.g. the media device 104a-c being switched on or off, or a change of channel). In alternative or additional embodiments, the application 108a-c may be arranged to send viewing data in response to prompts from the remote server 110, 112.

The frequency of polling of the media device 104a-c/of the sending of data may be adjusted dynamically in some embodiments. In some embodiments, the intervals and amount of data collected are adjusted to manage the number of data points and to ensure that sufficient data points are gathered for a particular purpose. The skilled person will appreciate that frequency and amount of data collected is likely to depend on the intended purpose of the output data, and so will vary between embodiments. For example, if the number of viewers is high (perhaps in the millions or hundreds of thousands for example) it might be considered satisfactory to poll less frequently. Further if the number of viewers remains static for a period then it might be considered satisfactory to poll less frequently.

At step 208, the data collector 110 transforms the received data into a structured data store for ease of processing.

At step 210, the data manager 112 aggregates the data from the structured data store into a dynamic database and applies sorting rules.

In addition to the dynamic database being dynamic in that rows and columns can be added, in many embodiments it is also arranged to dynamically calculate the polling intervals and the ratios of connected DVB®-T2 devices to total DVB®-T* devices within a given geographic area.

The sorting rules may be arranged to define the logic for data processing and/or to ensure that the results are statistically relevant.

The data manager 112 also receives, or has integrated therewith, additional data such as publicly-available census data. The data manager 112 matches this additional data to the viewing data where possible.

At step 212, the data manager 112 provides live business information via an interface for monitoring live broadcasting.

At step 214, the data manager 112 provides a report on audience consumption. The report may include one or more of total numbers of viewers per program, geographic distribution of viewers, numbers of viewers who watched a program from start to finish instead of channel-hopping, numbers of viewers who switched channel during advertisements, and the likes.

Figure 3:
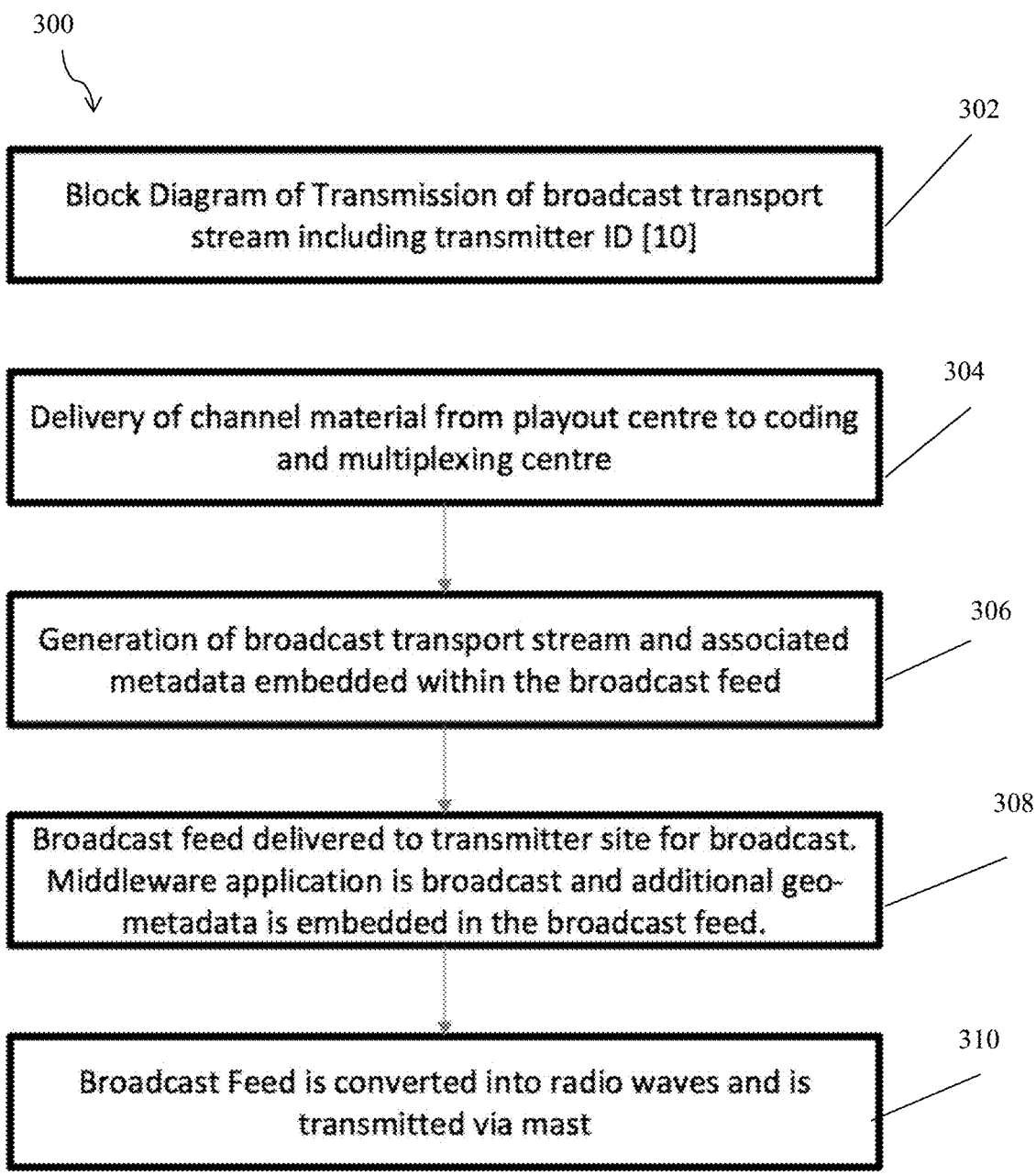
FIG. 3 shows a flow-chart of a transmission chain of an embodiment.

FIG. 3 illustrates steps of a method 300 of broadcast transmission 302 used in various embodiments of the invention.

At step 304, channel material is delivered from a playout centre to a coding and multiplexing centre.

At step 306, a broadcast transport stream is generated using the channel material, and associated metadata is embedded therein.

At step 308, the generated broadcast transport stream 103 is delivered to a transmitter 102 for broadcast. Additional metadata, including transmitter ID, is embedded into the stream.

In addition, in the embodiment being described the application 108a-c is transmitted to the media device 104a-c as part of the broadcast transport stream 103.

In the embodiment being described, the application 108a-c is transmitted to the media device 104a-c via an addressable network connection (eg the Internet or other network, which may be a wide area network and/or a private network, etc.), which may be thought of as providing the Interaction Channel (IC). The application 108a-c is therefore sent to the media device 104a-c on radio frequencies via the air, rather than via the internet.

The skilled person will appreciate that the addressable network connection described above was originally designed for Interactive TV services e.g. Digital Text, completion voting on Television programmes and IPTV streaming services. However, embodiments of the invention use the addressable network connection for providing the application 108a-c to the device for use.

The addressable network connection generally allows for two-way, closed-loops communications. A "handshake" to indicate that the received application 108a-c is trusted and accepted may be performed.

At step 310, the stream is converted into radio waves and transmitted from the transmitter 102.

Figure 4:
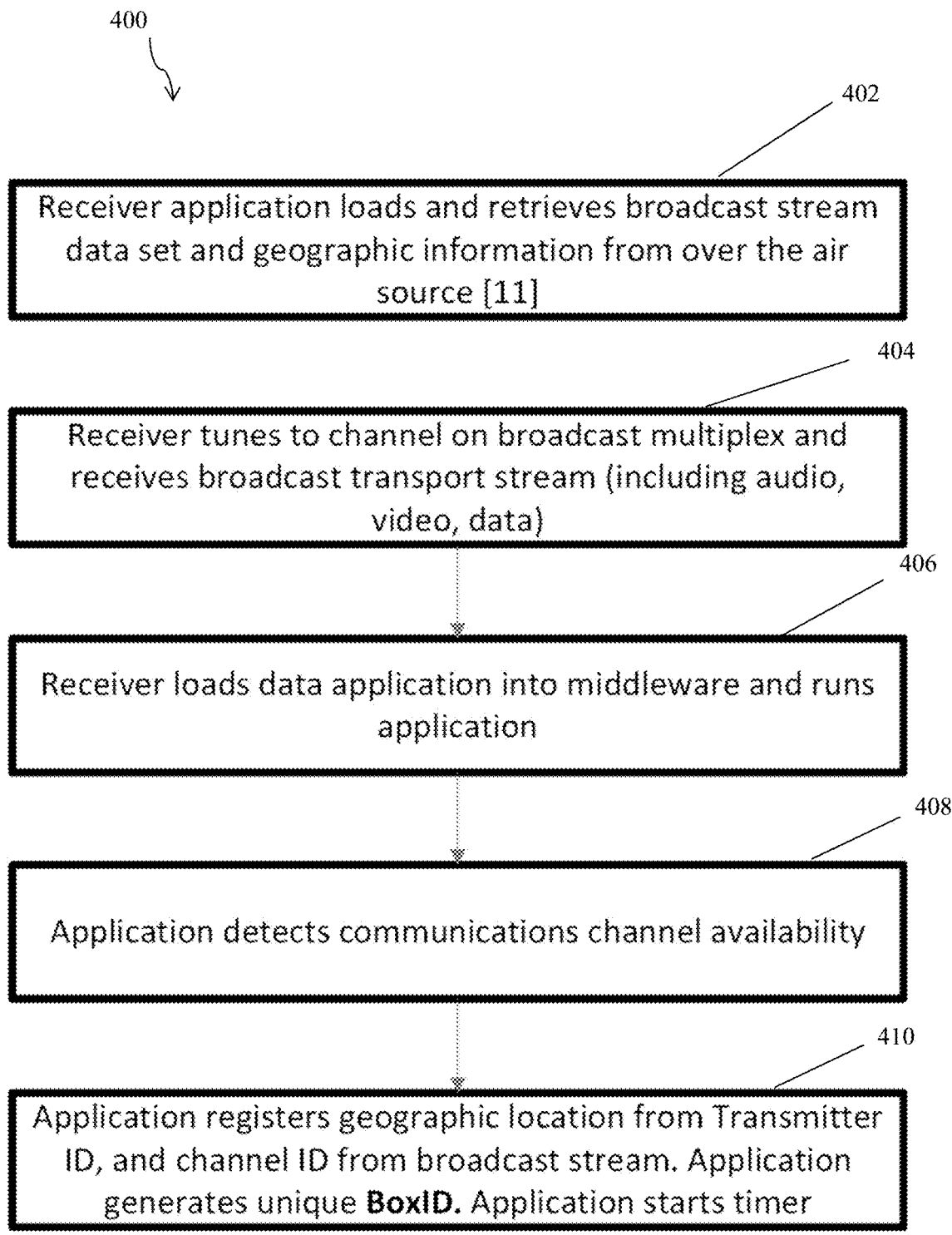
FIG. 4 shows a flow-chart of actions involving the receiver according to various embodiments.

FIG. 4 illustrates the interaction 400 between the application 108a-c and the media device 104a-c.

At step 402, a receiver of the media device 104a-c retrieves the broadcast stream. The broadcast stream includes media content and metadata, which implicitly includes geographic information in the form of the transmitter ID.

At step 404, the receiver of the media device 104a-c is tuned to a channel of the broadcast multiplex and receives a corresponding broadcast transport stream (in this case including both audio and video data, as well as associated metadata).

In the embodiment being described, the application 108a-c is broadcast as part of the broadcast stream and is downloaded to the media device 104a-c when a viewer lands on a particular channel.

In the embodiment being described, the application 108a-c is uniquely linked to a target channel—if the receiver of the media device 104a-c is tuned to another channel, a corresponding application 108a-c is downloaded for the newly-targeted channel. In use, the application 108 a-c is therefore generally downloaded and ceased on a regular basis, such as when a user starts to watch a given channel. In alternative embodiments, an application 108a-c may provide data for multiple channels, for example all channels provided by a particular operator, or all channels for which the operator has opted into a particular monitoring scheme.

At step 406, the media device 104a-c loads the application 108a-c into memory and runs it.

At step 408, the application 108a-c detects communications channel availability. The internet is used to communicate between the application 108a-c and the remote server 110, 112 in the embodiment being described.

At step 410, the application 108a-c determines a geographic location from the transmitter ID and a channel ID from the broadcast stream. In other embodiments, the transmitter ID and other information may be passed on to the remote server 110, 112 without any processing thereof, and geographic location may be determined at the remote server 110, 112.

The application 108a-c generates an identifier ("BoxID"), which is unique to the media device 104a-c in the embodiment being described. In the embodiments being described, the BoxID is not an ID assigned to the media device 104a-c by a remote entity. Rather, the application 108a-c creates its own ID for the specific instance (a, b or c) of that application 108, in the embodiment being described by using a combination of random number generation and date. The skilled person will appreciate that this is different from internet cookies which are generated on a server and assigned to a particular client. The skilled person will appreciate that this may be preferable in light of data protection laws, which may discourage giving a fixed ID to a receiver/media device 104a-c without viewer permission. In the embodiment being described there is no record linking a user to a BoxID.

The skilled person will appreciate that, for compliance with legal requirements for data collection and the protection of personal information, in the embodiments being described the application 108a-c does not provide any information on the viewer(s) to the remote server 110, 112, but only of the media device 104a-c. In alternative or additional embodiments, user information may be included in the data sent to the remote server 110, 112.

In the embodiments being described, the viewing data is therefore collected anonymously and it does not require any change in the viewers' behaviours—unlike BARB® which requires respondents to record which channels they are watching via a separate device.

In the UK regulatory environment, as the viewer's permission to use the application 108a-c is not sought, the approach of various embodiments is designed to be compliant with data privacy legislation. In such embodiments, the application 180a-c is arranged to collect data anonymously and without putting 'cookies' or similar on the media devices 104a-c. All data to do with the application 108a-c may therefore be wiped when channel is changed in some embodiments.

In some embodiments, the application 108a-c records the current time and starts a timer to record how much time, from the initiation time, is spent watching broadcast content on that channel ID. In other embodiments, such as the one described above, the application 108a-c simply regularly sends out a timestamp for a channel and does not make use of a timer for elapsed time. Total elapsed time can be calculated at the remote server 100, 112 from the first and last timestamps from an application 108a-c in such embodiments. The skilled person will appreciate that time and channel ID can be used to identify the content being presented at the media device 104a-c.

The skilled person will appreciate that, in many embodiments, the limited computing power of the media device 104a-c (e.g a TV and/or set-top box) running the application 108a-c may limit the amount of processing possible. The amount of useable data that can be provided by these media devices 104a-c may also be limited and, on its own, insufficient for the intended purposes. The small amount of information gathered by the application 108a-c is therefore combined with other data, remote from the media device, to create more useful information, as is discussed in more detail below.

In addition, in various embodiments, the application 108a-c is designed to work with the range of media devices 104a-c on sale in the UK and ensure that data can be collected without affecting the viewers' experience or causing the media devices 104a-c to slow down or fail. In various embodiments, the viewing data is therefore collected in low volumes; the skilled person will appreciate that this constrains the amount of data that can be transferred. In the embodiments being described, the bandwidth required is less than 15 kbs, and preferably less than 10 kbs. In some such embodiments, the application 108a-c has been designed to operate in a low-bandwidth manner by using a resource file which permits the application 108a-c to be used for any target channel.

Figure 5:
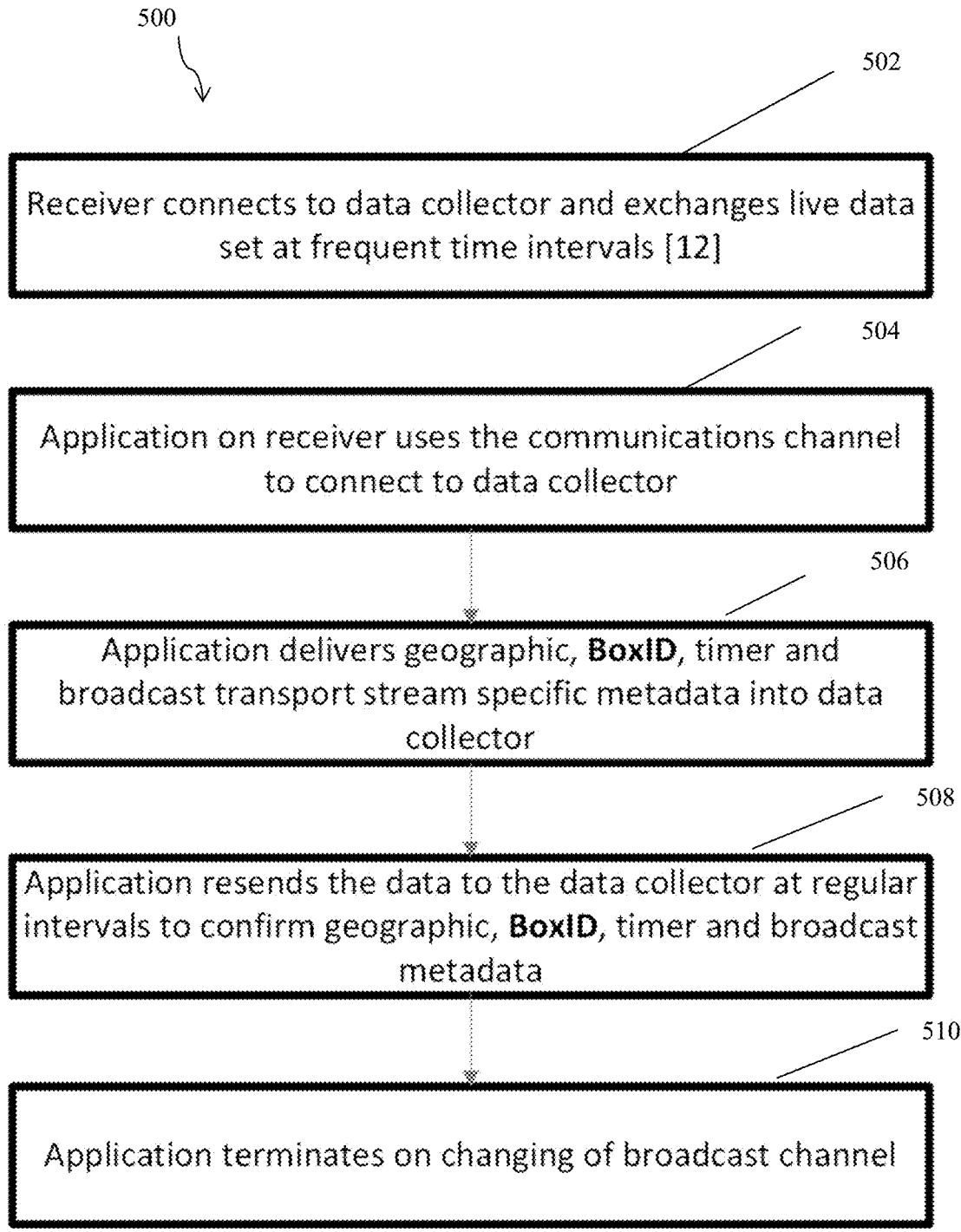
FIG. 5 shows a flow-chart of application information exchange according to various embodiments.

FIG. 5 details the method 500 of application information exchange performed in the embodiment being described.

At step 502, the media device 104a-c connects to the data collector 110 (via the application 108a-c, in the embodiment being described) so as to exchange data. In the embodiment being described, live data is sent to the data collector 110 at frequent time intervals. The frequency of sending data may be pre-set, or may change dynamically.

At step 504, the application 108a-c installed on the media device 104a-c uses a communications channel to connect to the data collector 110.

In the embodiment being described, a network, more specifically the internet (and more particularly a broadband connection) is used to transfer the data from the application 108a-c to the remote server 110, 112.

As the internet is used for this transmission, an internet transport protocol is used for the transmission. The transmission therefore has IP metadata associated therewith as a result of the transport protocol, often in the form of one or more headers.

In other embodiments, networks other than the Internet may be used and/or protocols other than TCP/IP may be used.

At step 506, the application 108a-c sends geographic information (derived from the transmitter ID), the BoxID, timer information and broadcast transport stream specific metadata to the data collector 110.

In the embodiment being described, the BoxID (which may be thought of as a device ID) is used with a session ID. The skilled person will appreciate that the application-generated BoxID may not be considered unique and so it may be used with a session ID to uniquely identify the receiver and the transaction or polling to which the data relates. In embodiments using a session ID, the session ID is generated by the remote server 110, 112 to ensure uniqueness and associated with the BoxID at the remote server 110, 112. In the embodiments being described, the session ID is never sent to the media device 104a-c, but rather is matched to transmitted data when the data are received at the remote server 110, 112. If two BoxIDs are the same, other information, such as IP metadata from a header may be used to assign the respective correct session IDs to the relevant data.

The use of a unique identifier allows the transfer of minimal data about the media device 104a-c once per session, generally on initiation of a session. In the embodiment being described, thereafter, when the application 108a-c is polled it simply sends a time stamp. In the embodiment being described, the session is terminated on changing channel, or on turning off the media device 104a-c and so if a user is no longer watching that channel a timestamp will not be received from that BoxID In the embodiment being described, the remote server 110, 112 associates each media device 104a-c with a session ID and a timeout value. The timeout value tells the remote server 110, 112 when to poll the media device 104a-c (in embodiments in which the remote server 110, 112 actively polls the media device 104a-c for each transmission), or is sent to the media device 104a-c from the remote server 110, 112 so that the application 108a-c knows how often to send data (in embodiments in which the application 108a-c does not need a prompt to send data); i.e. it sets the polling frequency or interval. The timeout value can be increased dynamically to reduce the loading on servers during busy times; or decreased to increase the resolution of the analytics. The skilled person will appreciate that this creates a viewing session that is dynamically generated.

In various embodiments, set data collection (i.e. data collection at set intervals/with a set timeout value) allows for measurement of viewer behaviour on a linear timescale—for example taking a measurement every 30 seconds. This creates a session that allows the application 108a-c to send confirmation of continued viewing every 30 seconds when using a fixed reporting mode. Some embodiments also allow for dynamic interval calculation—for example, with larger audiences a less frequent resolution may be needed, so dependent on the number of viewers the collection interval can be set.

In the embodiment being described, the application 108a-c is loaded each time a viewer lands on a particular channel and persists in temporary storage, e.g. random access memory, for as long as the viewer watches that channel. When the viewer switches to another channel, the application 108a-c ceases to exist and operate on the media device 104a-c (in some cases, after the sending of a termination message to the remote server 110, 112). Other data on the media device 104a-c is then not reported, until or unless the application 108a-c is re-installed/re-initiated.

In the embodiment being described, the application 108a-c has been designed to be automatically download each time a receiver/media device 104a-c is tuned to a particular channel. In this embodiment, the application 108a-c only operates in temporary storage (for example RAM) of the media device 104a-c and does not utilise any storage capabilities (if they exist) on the media device 104a-c. Once the channel is changed or the media device 104a-c turned off, the application 108a-c is erased from temporary storage and ceases to exist on the media device 104a-c. The next time the media device 104a-c is tuned to the target channel, the application 108a-c is loaded again and the process is repeated. The system 100 is designed this way to overcome limitations with the media device 104a-c and also to comply with strict limitations imposed by General Data Protection Regulation (GDPR) and forthcoming data protection legislation. The skilled person will appreciate that other approaches could be taken for systems or countries in which these technical and legal restrictions do not apply.

By contrast, Sky®'s reporting means exists permanently on their set-top box because, as part of the subscriber process, subscribers agree to this and provide their personal details, including household address, other data and bank account information as well. The Sky® system uses cookies or similar and stores information on the set-top box. The Sky® subscriber process provides data which Sky® use to segment their customers into demographic categories—this information is not available for DTT or other free-to-air broadcasts.

At step 508, the application 108a-c re-sends the geographic information, the BoxID, and updated timer information and broadcast transport stream specific metadata to the data collector 110.

At step 510, the application 108a-c is terminated on changing of the broadcast channel. In some embodiments, the application 108a-c may send a final message to the data collector 110 on termination.

Figure 6:
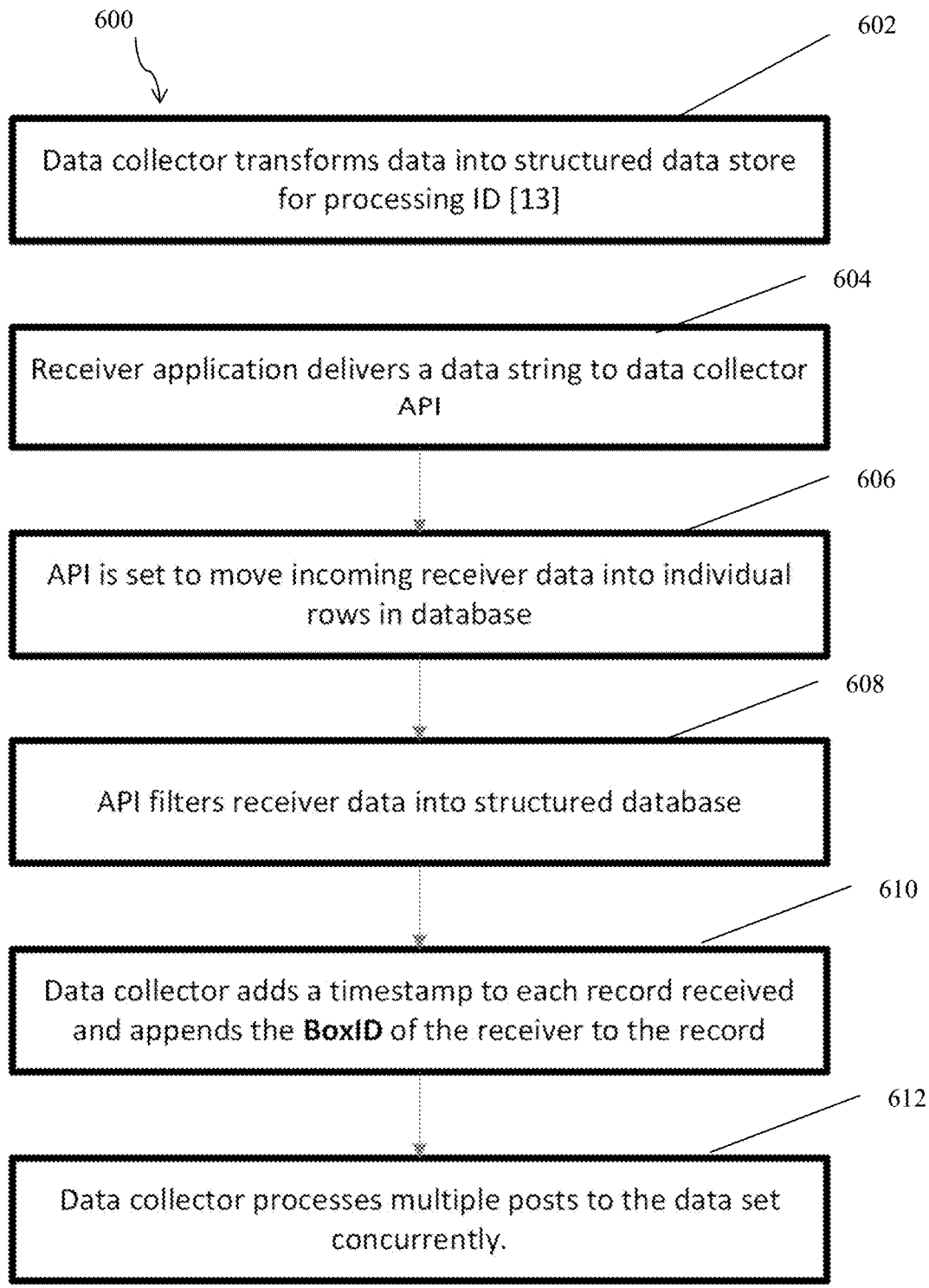
FIG. 6 shows a flow-chart of actions involving the data collector according to various embodiments.

FIG. 6 illustrates details of the steps 600 of the method 200 of the embodiment being described involving the data collector 110.

The data collector 110 transforms 602 data it receives into a structured data store for processing.

At step 604, the application 108a-c delivers viewing data to the data collector 110, in the embodiment being described to an application program interface (API) of the data collector 110.

The data collector 110 is arranged to move 606 incoming viewing data into individual rows in a database.

The data collector 110 filters 608 the received data into a structured database. In the embodiment being described, the data collector 110 temporarily writes data to a first database whilst a session is on-going, but as soon as the session completes (when the channel is changed or the device 104a-c switched off) the viewing data is written to a database of the data manager 112.

The data collector 110 adds 610 a timestamp to each record received, and appends the corresponding BoxID provided by the application 108a-c to each record.

In the embodiment being described, the data collector 110 is arranged to be able to process 612 multiple posts to the database concurrently.

Figure 7:
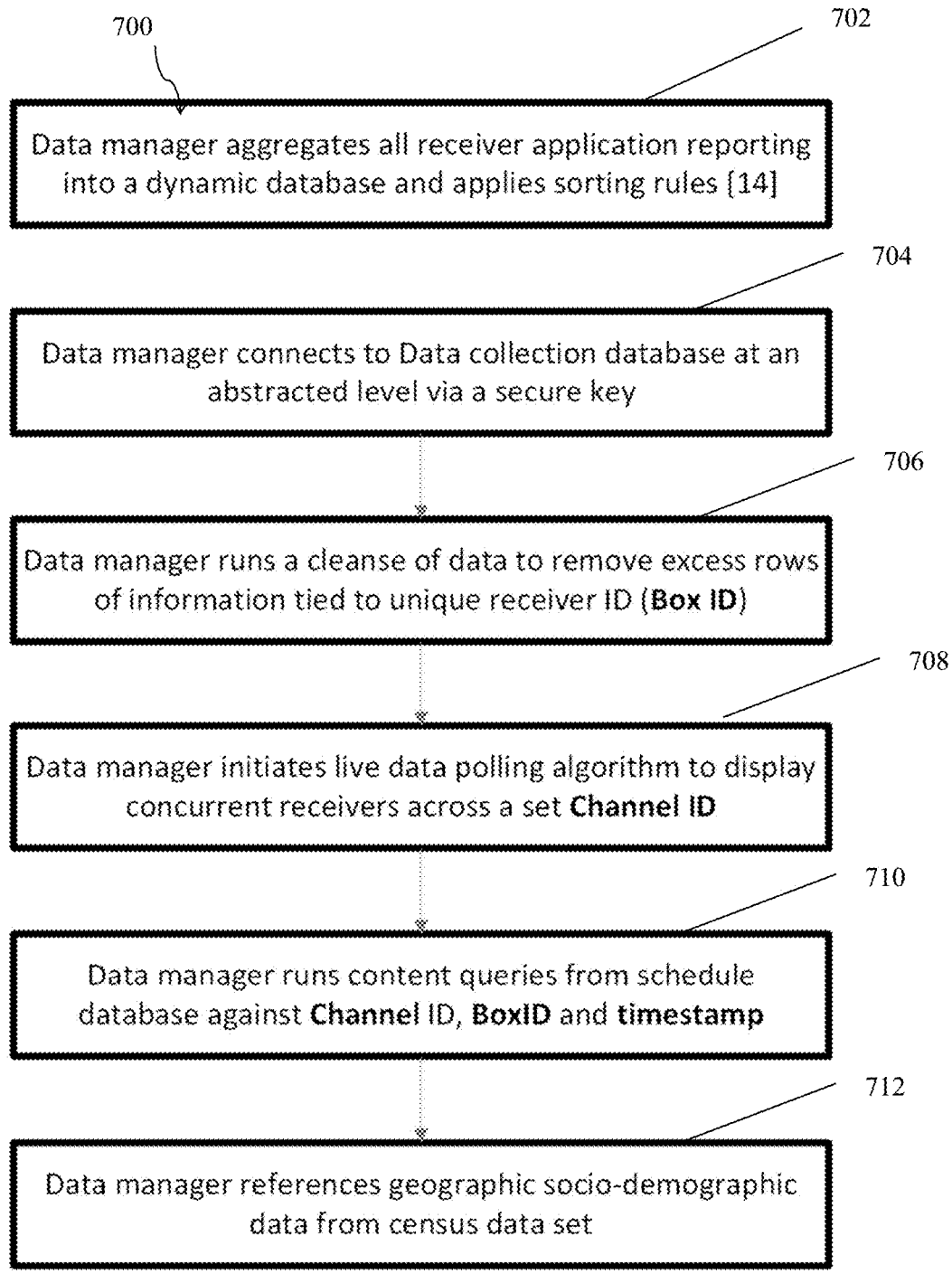
FIG. 7 shows a flow-chart of actions involving the data manager according to various embodiments.

FIG. 7 illustrates details of the steps 700 of the method 200 of the embodiment being described involving the data manager 112, when the data manager 112 is to be used for live viewer data for a particular channel.

The skilled person will appreciate that "live"/real-time audience data has not been made available previously, whereas BARB® provide historic views of viewing data these become available several days after the event and are subject to review/change for some time after that. By contrast, systems 100 of the invention may provide viewer statistics which are live—only delayed by the time it takes to collect the data, process and display. The delay may be of the order of 1 or 2 minutes.

The data manager 112 aggregates 702 all data received from the applications 108a-c into a dynamic database and applies sorting rules.

At step 704, the data manager 112 connects to the database of the data collector 110, In the embodiment being described, the connection 704 is performed at an abstracted level via a secure key.

At step 706, the data manager 112 cleanses data to remove excess rows of information tied to a unique media device 104a-c (Box ID and/or Session ID).

In the embodiments being described, excess rows of data are identified in relation to the date and time stamp for polling. Each time the media device 104a-c polls information, a record is created which the system 100 utilises to calculate the elapsed time for which the receiver/media device 104a-c has been switched on and tuned to the target channel.

To calculate the total elapsed time all that is required is the first date and time stamp record and the last—all intermediate date and time stamps can therefore be deleted.

In the embodiments being described, rows are only deleted once viewing trends have been established. Viewing trends can be used to determine suitable polling intervals once the system 100 has identified particular date and time stamps as intermediate. This is particularly beneficial in embodiments in which, when the channel is changed, the application 108a-c instantaneously ceases to exist, without sending a final/terminating message, and all polling ceases. The latest date and time stamp provided prior to termination is therefore the last record for that session. The total elapsed time spent on the channel can therefore be calculated and written to the database.

In the embodiment being described, the DTT broadcast provides the application 108a-c to the media device 104a-c and prompts the application 108a-c to contact the remote server 110, 112 via the internet connection to establish a connection.

In the embodiment being described, the initial contact from the application 108a-c provides basic data about the media device 104a-c in addition to the transmission metadata (channel, transmitter ID, etc.), a BoxID generated by the application 108a-c and a time and date stamp.

Thereafter, the media device 104a-c is polled by the remote server 110, 112 to provide confirmation, at intervals, that the application 108a-c is still present and active, and therefore that the media device 104a-c is still tuned to the relevant channel. Subsequent communications may therefore include only BoxID and an updated/new time and date stamp.

In alternative or additional embodiments, some or all of the additional data listed above as forming part of the first communication may be provided in later communications, for example to reduce bandwidth requirements of any one communication by splitting the data.

At step 708, the data manager 112 initiates a live data polling algorithm to display concurrent receivers for a set channel ID.

At step 710, the data manager 112 runs content queries from a schedule database against data such as channel ID, BoxID and timestamp.

In the embodiment being described, the schedule database is or comprises a database which contains other data sources which can be used to combine with the metadata obtained from the media device 104a-c.

Channel ID, transmitter ID and transport stream data and the likes are generally obtained as numbers. Once received at the remote server 110, 112 via polling, these numbers can be matched against a database which identifies what these mean e.g. the transmitter name, location, and whether it is part of a relay chain or a primary main station transmitter.

At step 712, the data manager 112 references geographic socio-demographic data from a census data set. Viewing data of interest is thereby matched to an estimated demographic of viewers.

Figure 8:
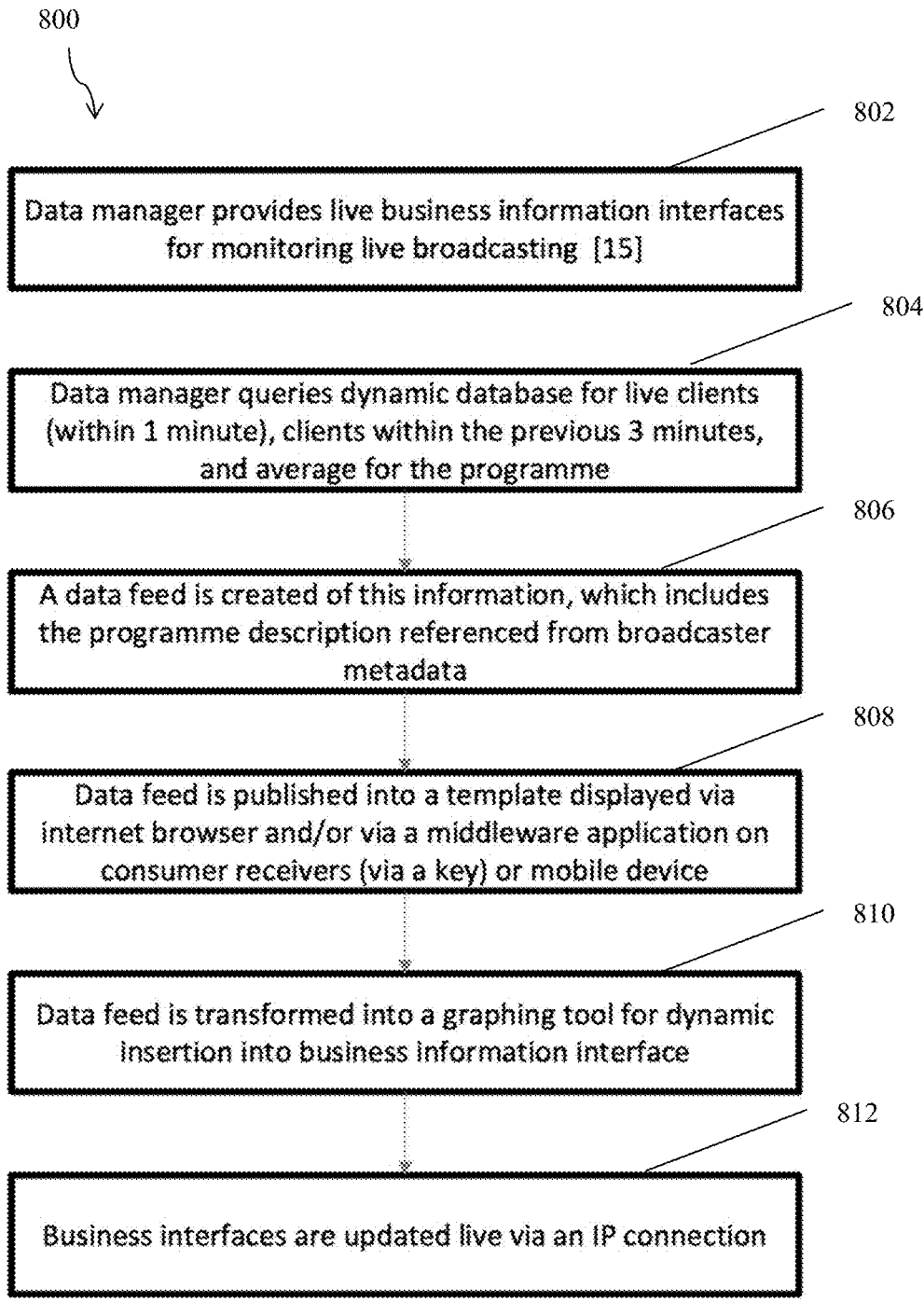
FIG. 8 shows a flow-chart of steps for the generation of outputs according to various embodiments.

FIG. 8 illustrates details of how information for customers may be generated 800 using embodiments of the invention. The skilled person will appreciate that the steps 800 may be performed in an order other than that shown.

In the embodiments being described, the data manager 112 is arranged to provide 802 live viewing data information to one or more interfaces arranged to allow the monitoring of live broadcasting.

At step 804, the data manager 112 queries the dynamic database for "live" viewers (i.e. BoxIDs corresponding to media devices 104a-c for which the channel ID in question has been reported as being watched within the last minute). The skilled person will appreciate that the time period selected for "live" viewers may differ in different embodiments.

In the embodiment being described, the data manager 112 also queries the dynamic database for recent viewers (i.e. BoxIDs corresponding to media devices 104a-c for which the channel ID in question has been reported as being watched within the last three minutes).

The skilled person will appreciate that the time period selected for "recent" viewers may differ in different embodiments, and/or that only a single time period, or more than two time periods, may be investigated. Here, reference to period may be thought of as being from time to time.

In the embodiment being described, the data manager 112 also queries the dynamic database to establish an average number of viewers for a program.

At step 806, a data feed of the information found in response to the queries is created. In the embodiment being described, the data feed includes a program description identified from broadcaster metadata (e.g. by matching time and channel ID to a TV schedule).

At step 808, the data feed is published into a template displayed via an internet browser and/or via a middleware application on a customer's receiver, which may be a mobile device such as a smart phone. In some embodiments, a key, password, or other authentication means may be needed to access the data feed.

At step 810, the data feed is transformed into a graphing tool for dynamic insertion into the interface.

At step 812, the interface is kept updated such that the data presented are live, via an internet connection.

Figure 9:
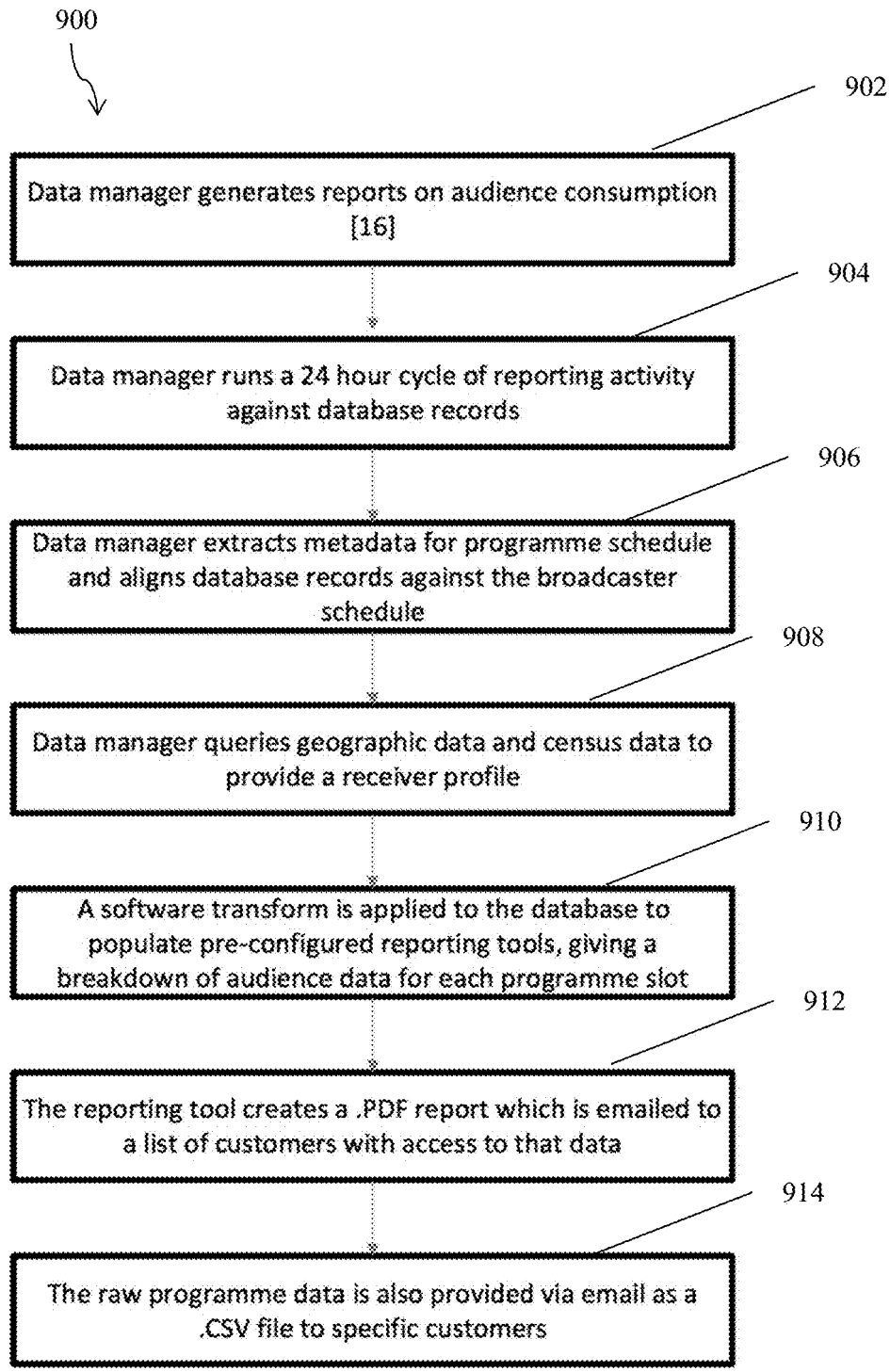
FIG. 9 shows a flow-chart of steps for audience reporting according to various embodiments.

FIG. 9 illustrates audience reporting steps 900 which may be performed in some embodiments of the invention. The skilled person will appreciate that the steps 900 may be performed in an order other than that shown.

At step 902, the data manager 112 initiates generation of a report on audience consumption.

The data manager 112 runs 904 a 24 hour cycle of reporting activity against database records. The skilled person will appreciate that the 24 hour period is a choice and that any other appropriate cycle length may be chosen.

The data manager 112 extracts 906 programme schedule metadata and aligns database records against the broadcaster's schedule. In this way, time and channel ID are matched to a program (and/or to other content such as advertising).

The data manager 112 queries 908 geographic data and census data, matching geographic data and census data to the viewing data records, so as to provide a profile of the viewers of particular content.

A software transform is then applied 910 to the database to populate pre-configured reporting tools. The pre-configured reporting tools may provide a breakdown of audience data for each program slot. In additional or alternative embodiments, dynamic queries may be used instead of, or as well as, pre-configured outputs.

The reporting tool creates 912 a report, for example in the form of a PDF file, for distribution to one or more customers. The report may be sent by e-mail, or other electronic transmission means.

The raw data may also be provided 914 to the one or more customers, or to a subset of the one or more customers who have requested it. The raw data may be provided as a CSV file.

The skilled person will appreciate that embodiments of the invention collect and store viewing data in an efficient and structured manner to facilitate the automatic generation of real-time information. Here, real-time may mean with a resolution of a few minutes; perhaps roughly 1 minute, 2 minutes, 4 minutes, 5 minutes, 10 minutes, or the like. This real-time information may then be displayed via a live 'dashboard' (a reporting tool as referenced above) which clients may access via computers, tablets or smart phones; and/or via reports, which may be issued daily, weekly or the likes. In various embodiments, the structured data stores and links various data sets, which may include census data and the likes. Algorithms may be used to predict, amongst other things, the total viewing hours and the house-hold demographic and location.

The skilled person will appreciate that the approach described herein allows viewing data to be collected from media devices 104a-c which meet a particular standard, in particular being Digital Video Broadcasting-Second Generation Terrestrial (DVB®-T2) compatible and being connected to the internet. At present, such devices account for a significant, but not 100%, proportion of viewing media devices 104 as a whole. The skilled person will appreciate that standards and applicability may change with time, and that the present application is not limited to DVB®-T2 compatibility, FIG. 10 summarises the method 1000 of various embodiments. The method 1000 is a method 1000 of automatically logging and collating geographic viewing data for digital terrestrial television (DTT) watched on a media device.

The method 1000 comprises, at step 10002, providing the media device 104a-c with a reporting means arranged to generate viewing data detailing a channel being watched on the media device.

In the embodiment being described, the reporting means is an application 108a-c. In alternative or additional embodiments, the reporting means may be provided as a plug-in device for connection to a media device 104a-c.

In the embodiment being described, the application 108a-c is provided to the media device 104a-c as part of the DTT broadcast.

At step 1004, viewing data are generated at the media device 104a-c.

At step 1006, the generated viewing data are transmitted from the media device 104a-c to a remote server 110, 112.

In the embodiment being described, the viewing data are transmitted by the application 108a-c, in a data packet.

At step 1008, the transmitted data are processed to identify information comprising at least one of:
  (i) a DTT transmitter ID of a DTT transmitter which transmitted the channel being watched to the media device; and
  (ii) an external IP address of the media device;

At step 1010, the geographical location from which the viewing-data originated is determined using the identified information. External data may also be used to determine the geographical location, for example by matching IP addresses or channel IDs to a corresponding geographical region. The determining step 1010 may therefore comprise a step of matching to external data.

At step 1012, the viewing data are matched to (further) external data using the determined geographical location and/or the viewing data.

In the embodiment being described, the external data include demographic information.

The external data may be matched 1012 to the viewing data based on the determined geographical location, and/or on other information such as channel type, device type, and the likes.

The skilled person will appreciate that the steps 1000 may be performed in an order other than that shown. For example, the processing 1008 of data to identify information from which location can be determined, and optionally also the determination 1010 of geographical location, may be performed by the reporting means, before the data are transmitted 1006 to the remote server 110, 112 for matching 1012 with external data. In such cases, the viewing data may be modified to include the determined location before it is sent 1006.

Further details and examples of how the approach 100, 1000 described herein gathers and uses data captured from the media device 104a-c and from other data sources are described below.

Application Data

The application 108a-c running on a media device 104a-c is arranged to provide:
  a) The TV channel being watched, which is identified from the logical channel number and packet identifier (PID) in the embodiment being described; and
  b) Time—which is calculated based upon polling with the media device 104a-c in the embodiment being described, but which may be provided as a timestamp in additional or alternative embodiments;
and optionally one or more of:
  c) External IP address;
  d) Transmitter ID, or a location/area as established from transmitter ID; and
  e) Receiver/media device type, model, manufacturer, and/or age.

External Data

The system 100 is arranged to gather external data (i.e. data other than that provided via the application) to be matched with the data provided via the application 108a-c running on the media device 104a-c. This external data may include one or more of the following:

a) Other viewing data from the same household—this may be identified by use of the same external IP address, and may be provided by a different instance of the same application running on a different media device 104a-c;
  b) Broadband Provider and/or broadband speed;
  c) Post code;
  d) TV viewing trends for the target household 104;
  e) Availability of other channels—this may be determined from Transmitter ID and/or Location;
  f) Whether the receiver is likely to be a primary or secondary set this may be determined by assessing all connected media devices 104a-c within the household 104;
  g) Responses to TV survey questions;
  h) Targeted market research;
  i) Average income by geography and demographic type;
  j) Other viewing trends which are derived from the same household—this may be identified by use of other viewing devices using the same external IP address and services using the same combination of transmitter ID—to determine trends over time;
  k) Market data for sales of receivers; and/or
  l) Data from Office of National statistics (e.g. census data).

In some embodiments, machine learning may be used to predict other information such as demographic information and type of household from the application data and/or from the other data gathered.

Processing

Using the above data, the system 100 then implements one or more processes to establish information about viewers. The viewing data may include one or more of the following:
  Total predicted UK viewing;
  Total predicted regional viewing;
  Estimated age range for each person residing within the household;
  Gender of each person residing within the household;
  Social demographic for the household, e.g. A, B, C1, C2 etc.;
  Household type e.g. student; single occupant; family with children; couple without children; etc.

One or more of the processes may be changed on a dynamic basis, for example according to processing and data handling capacity, or according to customer needs. In some embodiments, the processes are varied on a dynamic basis for each category e.g. by location, total UK, region, etc.

Data and factors for use in calculations may be generated for each region, taking into account regional characteristics and variability. For example, to derive the total number of DTT DVB® receivers within a region, factors may be used to multiply the base data for DVB®-T2 connected devices; one factor is used to multiply the base data to establish the total number of all DVB®-T2 devices (connected or not); and the other factor is used to establish the total predicted number of all DVB-T* devices. The factors may vary for each region as the ratio of DVB®-T2 connected devices varies; and the factors may be re-calculated on a dynamic basis based upon comparisons with base versus new data e.g. market data or for example the growth factor for DVB®-T2 devices taken from the respondent's data over time.

Viewer location can be estimated using a combination of data factors which include one or more of:
  TV Channel (some channels are only available in some regions);

External IP address compared with IP geographic location database;
Digital Terrestrial Transmitter ID;
Broadband provider; and/or
Postcode.

In some embodiments, the choice of method for estimating location is varied on a dynamic basis dependent upon the combination of the above data available. For example, if the IP address is not available (e.g. not present or accessible in a header), channel type and Transmitter ID may be used to approximate the location.

In various embodiments, dynamic algorithms are used to determine the total viewing profile for channels or groups of channels, for geographic locations, and/or for categories of household.

FIG. 11 illustrates a method 1100 of various embodiments of the invention.

The method 1100 of FIG. 11 can be used to automatically log and collate geographic viewing data for free-to-air television, such as DTT, watched on a media device 104a-c.

At step 1102, a transmission (for example a DTT transmission) comprising a reporting means and channel content, wherein the reporting means (the application 108a-c in the embodiments described above) comprises software is broadcast by a transmitter.

At step 1104, the transmission is received at a media device 104a-c.

At step 1106, the reporting means on the media device generates viewing data detailing a channel being watched on the media device.

At step 1108, the generated viewing data is transmitted to a remote server 110, 112 over a network connection.

The transmission may be in response to polling of the media device 104a-c by the remote server 110, 112.

Alternatively, the remote server 110, 112 may tell application 108a-c how frequently to provide viewing data (and may change this frequency as the session continues). Advantageously, the application 108a-c may then continue to poll without requiring feedback from the remote server 110, 112, so avoiding a need for more two-way communications.

FIG. 12 illustrates a system 1200 of various embodiments of the invention.

The system 1200 of an embodiment is used to collect data at three different levels—referred to as "Heartbeat", "Notification" and "Consent".

In the embodiment being described, "Heartbeat" is the base product and is arranged to operate without user awareness of monitoring. As such, no opt-in or opt-out options may be provided, and in the EU the product has to be GDPR compliant. The data that can be collected are therefore limited.

In the embodiment being described, Heartbeat simply counts viewers. It does not have data on whether that count is a single viewer for a long time or multiple viewers coming in and out. The counts are not linked to a particular device or particular person in the monitoring.

In the embodiment being described, "Notification" (also referred to as "Legitimate Interest", as discussed below) is an opt-out product. In this embodiment, "Notification" causes a 'pop-up' screen to appear when viewers select the relevant TV channel—the pop-up notifies the viewer that they are participating in an audience measurement survey and provides contact details (e.g. a website address) for viewers to object and withdraw from the monitoring. The skilled person will appreciate that different opt-out approaches may be implemented in different embodiments.

In the embodiment being described, more data are collected than for Heartbeat, and these are anonymised.

In the embodiment being described, "Consent" is an opt-in product. In this embodiment, "Consent" causes a 'pop-up' screen to appear when viewers select the relevant TV channel—the pop-up provides for the viewer to opt-in, for example by pressing a button on the remote control. The skilled person will appreciate that different opt-in approaches may be implemented in different embodiments.

The viewer's consent may enable the data collected to be legally used for targeted advertising and the likes.

It is expected that Heartbeat will provide the largest sample size—being applied to all relevant devices. It is expected that the Consent model will derive fewer respondents than the Notification model, and that Notification will therefore provide a larger sample size than Consent.

The choice of product(s) to implement (Heartbeat, Notification, and/or Consent) may be subject to each channel owner's agreement. The products are described in more detail below.

In the embodiment being described, the processing performed by the system 1200 is based upon a probabilistic statistical data model, which provides predictions from data samples.

In the embodiment being described, software arranged to implement the processing is hosted in the cloud and uses algorithms which are held within separate secure databases for security and resilience.

In the embodiment being described, the system 1200 is arranged to work with DVB®-T2 connected TV and set-top boxes (TV Receivers), and may not work with other set-ups.

For various products, i.e. Heartbeat, Notification, or Consent in the embodiment being described, the monitoring service provided commences when a TV channel has been linked to the service. In the embodiment being described, the monitored channel has a pointer to one or more IP addresses of a server 110, 112 of the system to provide this link. The skilled person will appreciate that additional or alternative linking methods known in the art may be used in other embodiments.

In the embodiment being described, the link is created using a transparent MHEG-5 (Multimedia and Hypermedia Experts Group) slate 1206 or HbbTV (Hybrid broadcast broadband TV) slate 1206 which provides the reporting means software to the viewing device 1212, 104.

In the embodiment being described, the Slate 1206 is injected into media content 1202 at a multiplexer 1204.

In the embodiment being described, the Slate 1206 is then broadcast via the Digital Terrestrial broadcast system (indicated by transmitter 1210), along with the media content 1202. System Information Manager (SIM) 1208 collates components for each service—e.g. audio, video and metadata components—including the slate 1206 in the embodiments being described. The slate 1206 is broadcast via each applicable channel and is broadcast with the channel owners' agreement.

In the embodiment being described, none of the data collected by the reporting means can be used, either directly or indirectly, to uniquely identify an individual person or persons or an individual.

For various products, i.e. Heartbeat, Notification, or Consent in the embodiment being described, all data is collected via a transaction between the TV receiver and the one or more servers 110, 112 of the system 1200. The transaction is initiated by the TV receiver 1212 when a viewer selects the relevant TV channel which includes the Slate 1206.

The transaction persists for as long as the relevant TV channel is selected and is automatically ceased when an alternative TV channel is selected by the viewer.

When a viewer selects a TV channel with a Slate 1206, the TV receiver 1212 initiates a transaction with the server 110, 112.

In the embodiment being described, the geolocation processor 106 behaves differently depending on if it is in Heartbeat, Notification, or Consent modes. In the embodiment being described. IP addresses are only used in Consent mode.

The data collector 110 receives and process transactional data from the sample of TV receivers, which are DVB®-T2 receivers in the embodiment being described.

Depending upon which product is deployed (i.e. Heartbeat, Notification, or Consent in the embodiment being described), different data may be provided via the transaction—more details are provided below.

For all products, relevant data is automatically anonymised upon receipt in the embodiment being described. The skilled person will appreciate that what data is anonymised may depend on the product selected and on legal requirements in the relevant territory.

Information is then compiled and transferred to the data manager 112 for further processing.

The data manager 112 comprises several databases in the embodiment being described, with statistics derived from a variety of sources. In the embodiment being described, data used comprises population census data and other data. The model applied to generate viewing data output in the embodiment being described utilises different sources of data to refine and improve the accuracy of predictions over time.

In the embodiment being described, the output is compiled and produced automatically, without manual intervention. The output may, for example, be in the form of a live dashboard and/or overnight reports.

More details of the three products/modes of the embodiment being described are provided below:

Heartbeat

The viewer is not notified about the transaction. The TV receiver interacts with the server 110, 112 in the following ways, sending data to the server 110, 112:

1. A transaction is created between the TV receiver 104, 1212 and the servers 110, 112 which has a unique transaction ID (which may also be referred to as a Session ID). The transaction/session ID may be generated at the media device. The transaction is initiated as a poll, similar to a 'ping', from the TV receiver 104, 1212 to the server 110, 112 with a time and date stamp from the TV receiver. There is nothing to identify the receiver 104, 1212.
2. The household external IP is not stored; however transactions of the type used in the embodiments being described generally cannot be created without utilising the IP address at the send and receive end of the transaction. In the embodiment being described, the IP address for the household is fully discarded by the system 1200 (and not merely anonymised via a Hash or similar) in the embodiment being described, and this is done before the geolocation process meaning the IP address is not used to provide any data. The IP address is therefore not used in any way to derive any demographic or other information e.g. broadband provider or household geographic location in such embodiments— the skilled person will appreciate that this may be necessary for compliance with various data protection laws.
3. Information which is broadcast via the Digital Terrestrial Television (DTT) as transport stream data which includes the DTT transmitter ID is sent from the TV receiver 104, 1212 to the server 110, 112. The transmitter ID can identify which transmitter 102, 1210 broadcast the TV signal e.g. Crystal Palace in London or Sutton Coldfield in the West Midlands.

Notification

In addition to the Data described above which is collected by Heartbeat, Notification can collect the following additional information in the embodiment being described:

TV receiver model

Quasi-unique box-ID. This is a random number generated by the box used to distinguish the box from others. It cannot be used to reverse track/contact a box and is destroyed on a factory reset.

Broadband IP address, which is used to identify the location of the household and also other information such as the broadband provider. The IP address is anonymised by hashing/removal of the last quartet after processing via the geolocation process in the embodiments being described.

The skilled person will appreciate that additional or alternative information may be collected in other embodiments depending on legal requirements and intended purpose of the data.

Under GDPR legislation, a company can legitimately process personal confidential information if it is necessary for the purposes of providing a service. In this case, channel operators have a legitimate interest because viewer statistics are needed to successfully continue to provide free to air television (rather than subscription TV). However, if a channel operator is uncomfortable about using the Notification mode (also referred to as a "Legitimate Interest" mode), they can opt for the Consent mode or the Heartbeat mode. Thus, a channel operator will select a mode for their channel(s).

Consent

In addition to the Data described above which is collected by Notification with consent, information about the set-top box viewing may be used to replace broadcast adverts with tailored ones (with the broadcaster's consent).

The skilled person will appreciate that opt-in consent for targeted advertising may not be legally required in some jurisdictions and scenarios, and that such use may therefore be implemented with Heartbeat-type and/or Notification-type products in other embodiments.

Further, consent given on one channel may apply across all participating channels in some embodiments—the viewer may therefore only be presented with the pop-up on accessing a first participating channel.

Table 1, below, summarises the data that is collected and stored for each product:

TABLE 1

| # | Data component | Heartbeat | Notification | Consent |
|---|---|---|---|---|
| 1. | TV receiver ID | X | ✓ | ✓ |
| 2. | Broadband IP address (anonymised) | X | ✓ | ✓ |
| 3. | Transaction ID | ✓ | ✓ | ✓ |
| 4. | Transaction start & end times | X | ✓ | ✓ |
| 5. | DTT transport stream | ✓ | ✓ | ✓ |

TABLE 1-continued

| # | Data component | Heartbeat | Notification | Consent |
|---|---|---|---|---|
| 6. | TV receiver model | X | ✓ | ✓ |
| 7. | TV receiver serial number | X | ✓ | ✓ |

Set-Top Box Modes

In the embodiment being described, each set-top box has a flag defining it as either "Objected", "Heartbeat", "Notification" or "Consent".

Initially, a box is assumed to be in heartbeat mode until it tunes to a relevant channel showing a pop-up. Once the pop-up has been seen it will be flagged as in "Legitimate Interest" or "Notification" mode and if the user clicks consent it will change to "Consent" mode. Finally if someone contacts the provider to object, then they will be given instructions (e.g. to press a series of buttons on a remote) to put their box into 'object' mode. In object mode the box will be excluded from the monitoring and not send any data in the embodiment being described. In alternative embodiments, Heartbeat data only may still be sent in object mode.

In the embodiment being described, the pop-ups may be set to re-appear after a certain time period (e.g. every six months) to remind viewers. In the embodiment being described, if a viewer has consented then their renewal pop-up will include an option to opt-out using the same method as they opted in. This will return them to 'legitimate interest' mode. Note that if a viewer has objected they will not see future pop-ups and not need to re-object (unless they factory reset their set-top box, in which case settings may be lost).

Channel Operator Modes

In the embodiments being described, a channel operator can decide how they want data to be collected on their channel (s). A default method may comprise providing:

Data on average viewer numbers only via Heartbeat mode;

Augmentation of that data with reach data provided by legitimate interest mode an consent mode boxes (reach data is a way of measuring the audience size over a period. For example a three minute reach is the number of households that watched a channel and remained watching for at at least three minutes or more; 24 hour reach is the number of households that watched the channel for any period of time in the last twenty four hours. The skilled person in the field will be familiar with various such measures); and Further augmentation of that with demographic and geographic data from Consent mode boxes.

The skilled person will appreciate that, in Heartbeat mode, although only minimal data is collected this data and the metadata associated with its transmission can be analysed, using various assumptions, external data sets and statistics, to provide some extrapolated geographic and demographic information. In Notification or Consent mode, additional information may be collected, which may make the geographic and demographic information more reliable. The additional data may be used to replace or refine estimates made using Heartbeat data only.

A channel operator may instead decide to only collect data from those that have consented, or only collect live viewing data using heartbeat mode (and thus not requiring consent or to inform).

A channel operator might decide not to have pop-ups. In this scenario, data on the relevant channel(s) may be collected in Heartbeat mode for all boxes, but Notification or Consent data may not be collected at all, or may be collected only from boxes that have been informed or consented on another channel (e.g. from seeing a pop-up on another channel). The terms provided in or via the pop-ups may therefore be broad enough to encompass channels other than that on which the pop-up appeared.

The skilled person will appreciate that various elements of the embodiments described herein may be provided as software, hardware, firmware, or any combination to these. For example, although the reporting means is described as a software application 108a-c is could conceivably be provided as firmware and/hardware.

The invention claimed is:

1. A method of automatically logging and collating geographic viewing data for broadcast television watched on a media device, wherein the broadcast television is free-to-air broadcast television, the method comprising:
   generating viewing data detailing a channel being watched on the media device automatically once received by the media device, and transmitting that viewing data to a remote server using a transport protocol so as to form transmitted viewing data comprising the generated viewing data and one or more headers associated with the transport protocol;
   processing the transmitted viewing data to identify transmission metadata from a transmitter which transmitted the channel being watched to the media device;
   matching at least one of the viewing data and the transmission metadata to external data; and
   determining the geographical location from which the viewing data originated based on the transmission metadata.

2. The method of claim 1, wherein the free-to-air broadcast television is digital terrestrial television (DTT) and the transmitter is a DTT transmitter.

3. The method of claim 1, wherein the steps of generating viewing data and transmitting that viewing data are performed utilising an application installed on the media device.

4. The method of claim 1 wherein the viewing data comprises at least one of time and channel information.

5. The method of claim 1, further comprising generating a session ID at the media device and sending the session ID with the viewing data.

6. A method of automatically logging and collating geographic viewing data for broadcast television watched on a media device, the method comprising:
   generating viewing data detailing a channel being watched on the media device automatically once received by the media device, and transmitting that viewing data to a remote server using a transport protocol so as to form transmitted viewing data comprising the generated viewing data and one or more headers associated with the transport protocol;
   processing the transmitted viewing data to identify transmission metadata from a transmitter which transmitted the channel being watched to the media device;
   matching at least one of the viewing data and the transmission metadata to external data; and
   determining the geographical location from which the viewing data originated based on the transmission metadata, wherein the transmission data based on which the geographical location is determined includes Transmitter ID and channel type.

7. The method of claim 1 wherein no personal information of a viewer is sent to the remote server.

8. The method of claim 1 wherein the remote server polls the media device at intervals to request the viewing data.

9. The method of claim 1 wherein the remote server tells the media device how frequently to poll and the media device provides the viewing data accordingly.

10. The method of claim 1 wherein the external data comprises demographic data.

11. The method of claim 1 wherein the transmitting the viewing data to the remote server is performed using an internet connection of the media device.

12. The method of claim 1 further including transmitting software to the media device as part of the broadcast, the software serving to perform the steps of generating viewing data and transmitting that viewing data.

13. The method of claim 12 wherein the software is transmitted using the addressable network connection.

14. A system for automatically logging and collating geographic viewing data for broadcast television watched on a media device, wherein the broadcast television is free-to-air broadcast television, the system comprising:
- an application installed on the media device, the application viewing data detailing a channel being watched on the media device automatically once received by the media device, and transmitting that viewing data to a remote server using a transport protocol so as to form transmitted viewing data comprising the generated viewing data and one or more headers associated with the transport protocol;
- the remote server being arranged to:
  - receive transmitted viewing data from a transmitter which transmitted the channel being watched to the media device;
  - process the transmitted viewing data to identify transmission metadata;
  - match at least one of the viewing data and the transmission metadata to external data; and
  - determine the geographical location from which the viewing data originated based on the transmission metadata.

15. The system of claim 14 wherein the system comprises one or more geographic or demographic data sources arranged to provide the external data to the remote server.

16. The system of claim 14 wherein the remote server is arranged to extract an external IP address from a header of the one or more headers.

17. The system of claim 14 wherein the application is software arranged to run on the media device, and wherein the application is transmitted to the media device as part of the broadcast.

18. The method of claim 1, wherein the external data comprises geographic socio-demographic data, the method further comprising:
- using the matching of at least one of the viewing data and the transmission metadata to the external data to predict demographic information of a viewer using the geographic socio-demographic data.

19. A method of automatically logging and collating geographic viewing data for broadcast television watched on a media device, the method comprising:
- generating viewing data detailing a channel being watched on the media device automatically once received by the media device, and locally randomly generating a temporary ID for a viewing session such that there is no record associating a user with the temporary ID;
- transmitting that viewing data to a remote server using a transport protocol so as to form transmitted viewing data comprising the generated viewing data and one or more headers associated with the transport protocol, the temporary ID being arranged to be transmitted as part of the viewing data so as to allow viewing data from the viewing session to be grouped together, and to be deleted when the viewing session ends due to a change of channel or the media device being switched of;
- processing the transmitted viewing data to identify transmission metadata from a transmitter which transmitted the channel being watched to the media device;
- matching at least one of the viewing data and the transmission metadata to external data; and
- determining the geographical location from which the viewing data originated based on the transmission metadata.

* * * * *